US006549728B2

(12) United States Patent
Smart et al.

(10) Patent No.: US 6,549,728 B2
(45) Date of Patent: Apr. 15, 2003

(54) INTERFACE CONTROL ASSEMBLY FOR A ONE-TIME-USE CAMERA HAVING A RECORDING HEAD

(75) Inventors: David C. Smart, Fairport, NY (US); Craig A. Baker, Marion, NY (US); Michael L. Wash, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/735,112

(22) Filed: Dec. 12, 2000

(65) Prior Publication Data

US 2002/0071666 A1 Jun. 13, 2002

(51) Int. Cl.⁷ .................. G03B 17/02; G03B 17/24; G03B 1/00; G03B 29/00
(52) U.S. Cl. ................ 396/6; 396/320; 396/388; 396/429
(58) Field of Search ................ 396/6, 311, 319, 396/429, 388, 320

(56) References Cited

U.S. PATENT DOCUMENTS

| 4,384,771 A | 5/1983 | Sakurada et al. |
| 4,529,282 A | 7/1985 | Yamamoto |
| 4,933,780 A | 6/1990 | Wash et al. |
| 5,555,252 A | 9/1996 | Brock et al. ................ 354/106 |
| 5,572,267 A | 11/1996 | Swanson et al. |
| 5,608,490 A | 3/1997 | Ogawa |
| 5,625,429 A | 4/1997 | Kazami et al. |
| 5,659,828 A | 8/1997 | Shimizu et al. |
| 5,701,529 A | 12/1997 | Yokonuma et al. |
| 5,710,618 A | 1/1998 | McIntyre |
| 5,715,486 A | 2/1998 | Kim et al. |
| 5,715,487 A | 2/1998 | McIntyre et al. |
| 5,726,737 A | 3/1998 | Fredlund et al. ................ 355/40 |
| 5,749,007 A | 5/1998 | Sakurai |
| 5,819,126 A | * 10/1998 | Kitagawa et al. ........... 396/319 |
| 5,963,752 A | * 10/1999 | Zander ........................ 396/429 |
| 5,983,026 A | * 11/1999 | Allen et al. ..................... 396/6 |
| 6,088,528 A | * 7/2000 | DeCecca et al. ................ 396/6 |

* cited by examiner

*Primary Examiner*—Christopher Mahoney
(74) *Attorney, Agent, or Firm*—David A. Novais

(57) ABSTRACT

An interface control assembly for a one-time-use camera having a recording device includes a controller for receiving and storing photofinishing information and a communication device that transfers the information from the controller to the recording device of the camera to cause the information to be written on a filmstrip. The photography arrangement includes a one-time-use camera as well as the interface control arrangement. This permits the one-time-use camera to be customized with a magnetic recording on the film while providing the expensive components involved in magnetic recording on the film outside of the camera.

29 Claims, 30 Drawing Sheets

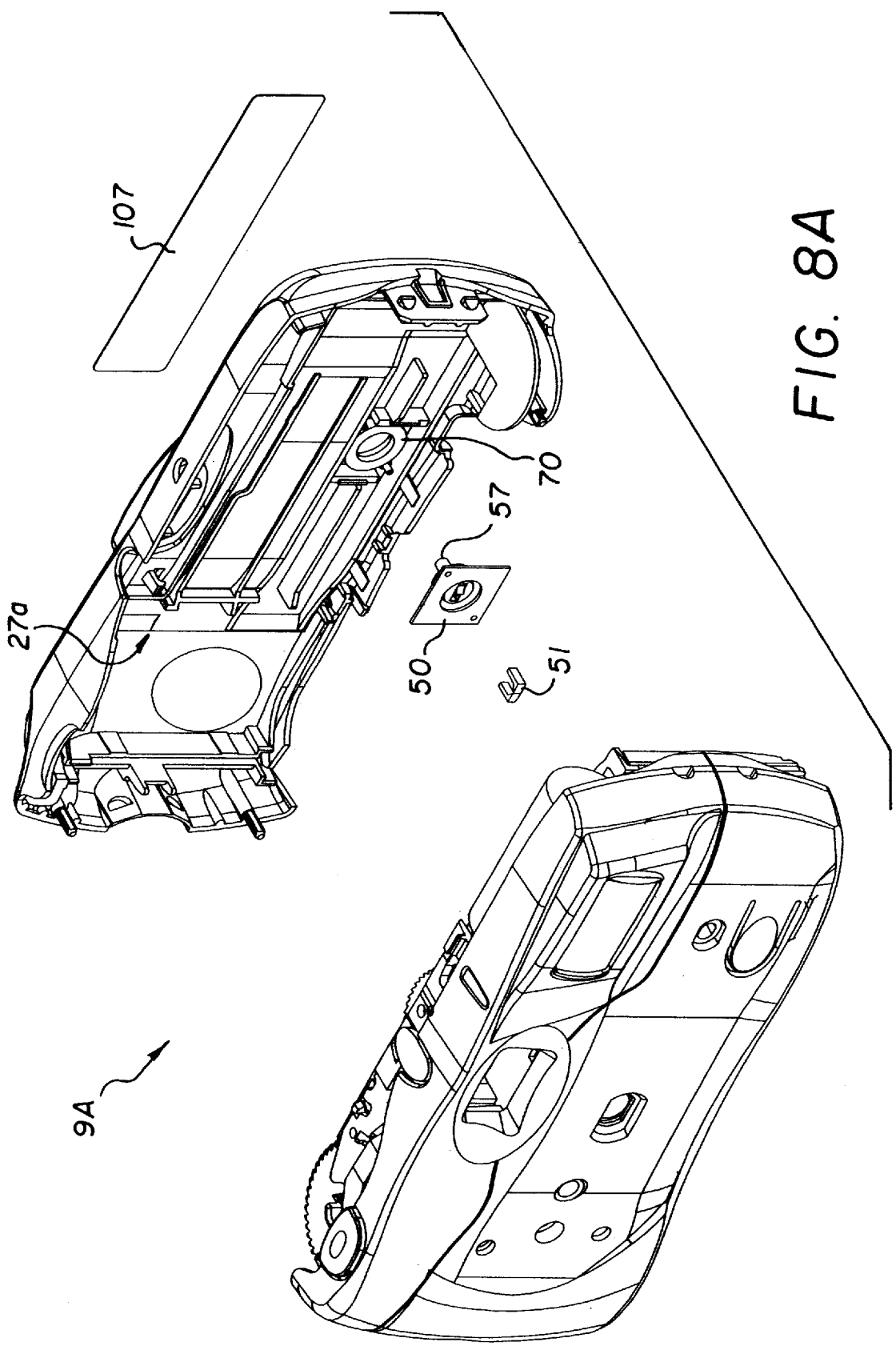

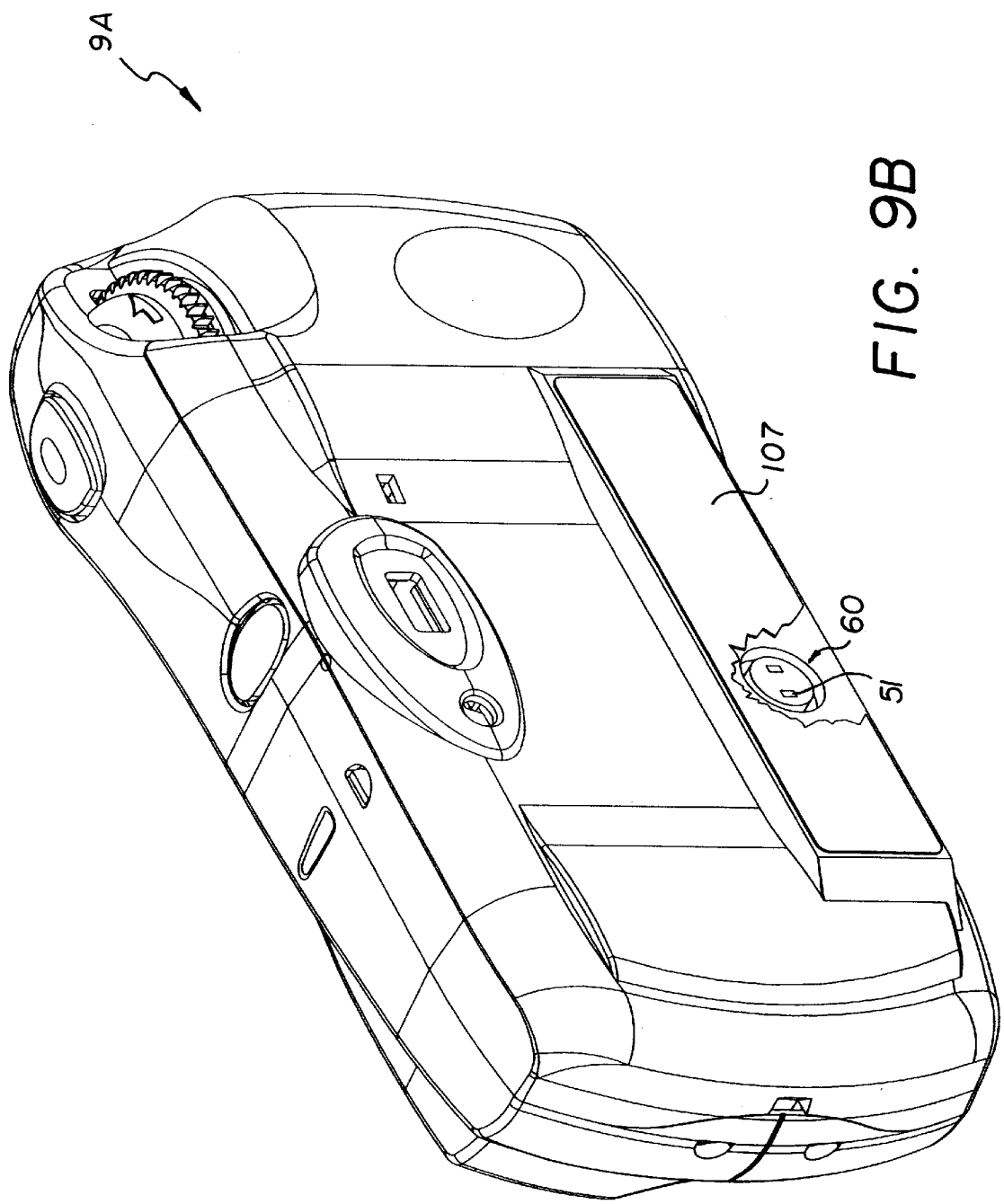

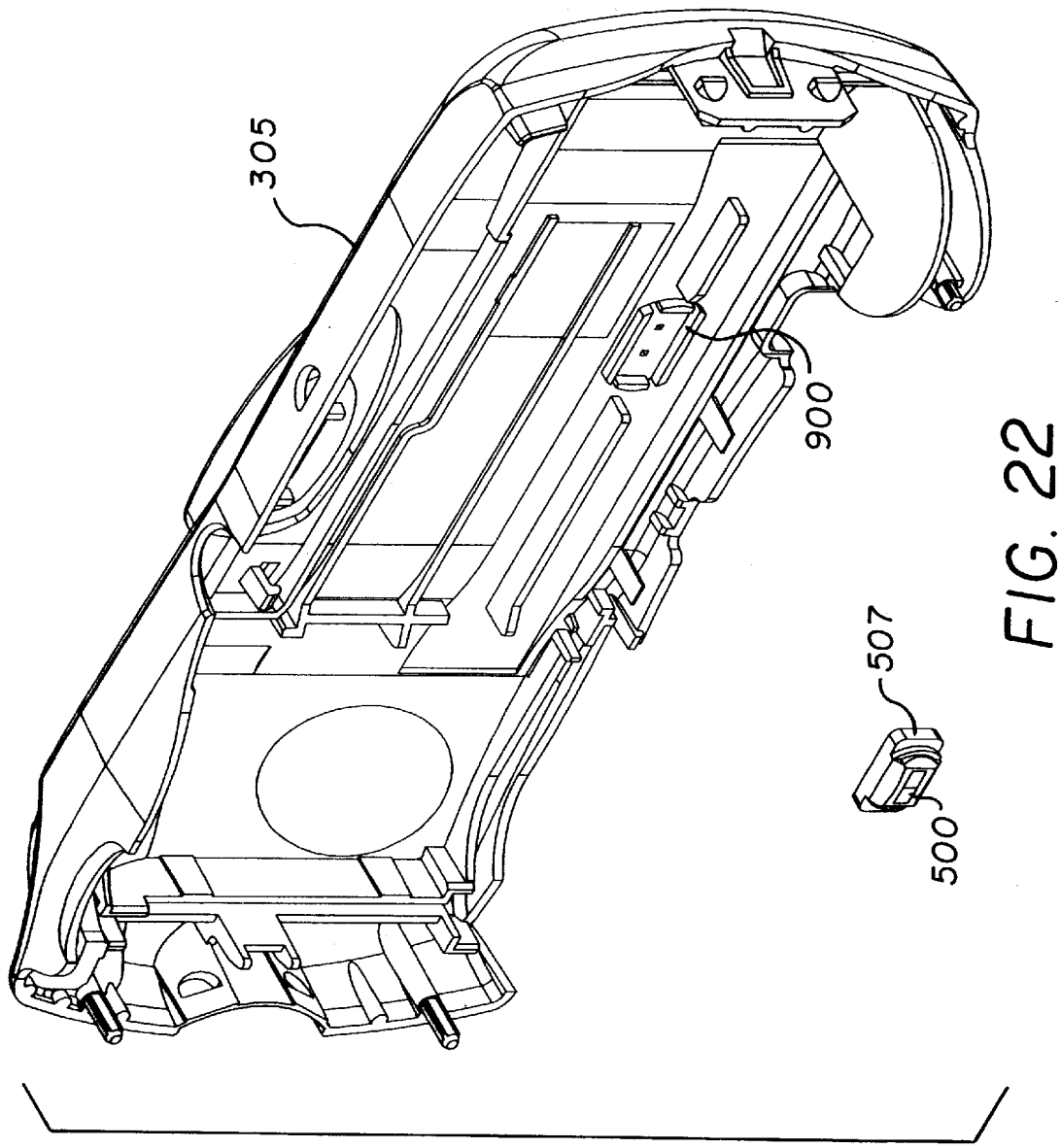

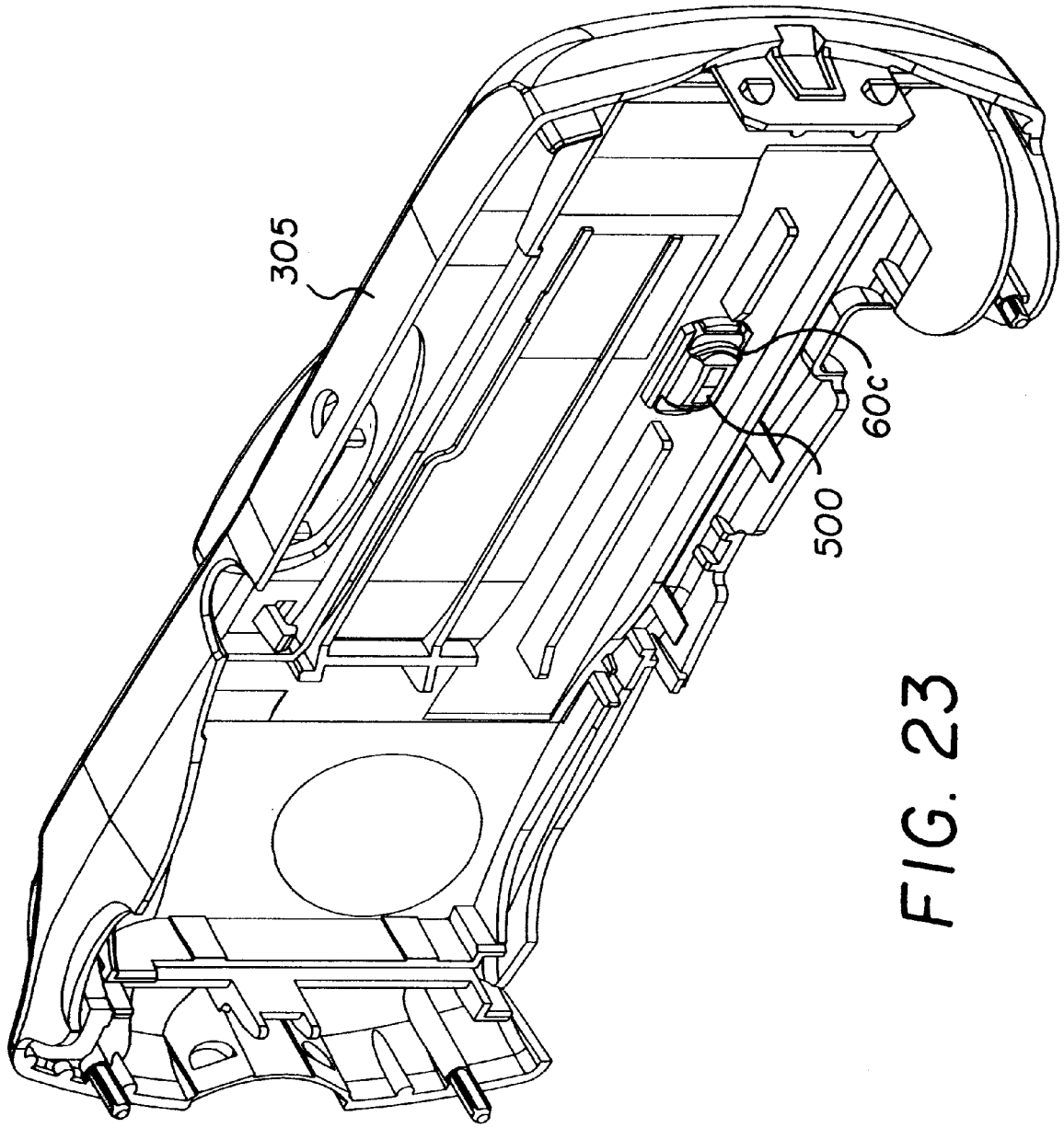

INTERFACE CONTROL ASSEMBLY FOR A ONE-TIME-USE CAMERA HAVING A RECORDING HEAD

FIELD OF THE INVENTION

The present invention relates to the field of magnetic recording on film of one-time-use cameras. More specifically, the present invention relates to an interface control assembly for a one-time-use camera having a recording device, as well as a photography arrangement which includes the one-time-use camera as well as the interface control assembly. The present invention further relates to a one-time-use camera having a low cost recording device in the form of magnetic pole pieces which is enabled to interact with the interface control assembly.

BACKGROUND OF THE INVENTION

U.S. Pat. No. 4,933,780 describes the use of magnetic recording and photographic apparatuses for the purpose of transferring information from film manufacturers and camera users to photofinishing equipment. This provides benefits such as permitting the customer to create titles for their pictures that will be reproduced on prints and many other uses. Typically, reloadable cameras that support this communication have expensive components that include a magnetic recording head, a logic controller for written messages, and a reliable drive for moving the film with a predictable and constant velocity.

One-time-use cameras cannot support this information channel because of the high cost of the recording apparatuses. Further, motorized film advance mechanisms are expensive while those operated by hand move the film without consistent velocity, as users wind the film in a stop and start fashion. The magnetic head and control circuitry are also expensive. Therefore, recording in one-time-use cameras has not been economically feasible.

SUMMARY OF THE INVENTION

The present invention provides for an arrangement in which the expensive components involved in writing information on the film of a camera is moved outside of the camera. This permits the recording of information on film of an enabled one-time-use camera without adding significantly to the cost of the camera.

The present invention provides for an interface control assembly for a one-time-use camera having a recording device. The interface control assembly comprises a controller adapted to receive and store photofinishing information; and a communication device adapted to transfer the information from the controller to the recording device of the camera to cause the information to be written on a filmstrip in the camera.

The present invention further provides for a photography arrangement that comprises a one-time-use camera having a recording device for recording on film in the camera, and a film advance mechanism for advancing the film. The photography arrangement further comprises an interface control arrangement that is adapted to supply photofinishing information to the recording device for writing on the film. The interface control arrangement is configured to receive the one-time-use camera in a recording position. The interface control arrangement comprises a controller for receiving and storing the photofinishing information, and a communication device for transferring the information from the controller to the recording device of the one-time-use camera to cause the information to be written on the film when the one-time-use camera is in the recording position.

The present invention further relates to a one-time-use camera which comprises a recording device for writing information on film in the camera. The recording device comprises at least one magnetic pole piece which is adapted to be moved between a non-recording state in which the at least one magnetic pole piece is spaced from the film and a recording state in which the at least one magnetic pole piece is urged against the film and an electrical current is applied to the at least one magnetic pole piece.

The present invention further relates to a one-time-use camera which comprises a recording device for writing information on film in the camera. The recording device comprises at least one magnetic pole piece which is provided in a cover of the camera. The at least one magnetic pole piece has a first end which is in contact with film in the camera for recording on the film when a current is applied to the at least one magnetic pole piece.

The present invention further relates to a method of recording information on film of a one-time-use camera. The method comprises loading a one-time-use camera having at least one magnetic pole piece therein on an interface control assembly having a contact member; supplying an electrical current to the at least one magnetic pole piece; and urging the contact member toward the one-time-use camera to force the at least one magnetic pole piece into contact with the film in the camera.

The present invention further relates to a method of recording information on film of a one-time-use camera which comprises loading the camera having at least one magnetic pole piece therein on an interface control assembly, with the magnetic pole piece being positioned so as to be in contact with film in the camera; and recording on the film of the one-time-use camera by supplying an electrical current to the at least one magnetic pole.

BRIEF DESCRIPTION OF THE DRAWINGS

FIG. 8A is an exploded view of an enabled one-time-use camera in accordance with one feature of the present invention;

FIG. 9B is a view similar to FIG. 9A with a portion of a covering member deleted to show the recording device;

FIG. 22 is a perspective view showing the camera of FIG. 21; and

FIG. 23 is a view similar to FIG. 22 with the recording device mounted on the rear cover of the camera.

DETAILED DESCRIPTION OF THE INVENTION

Figure 1:
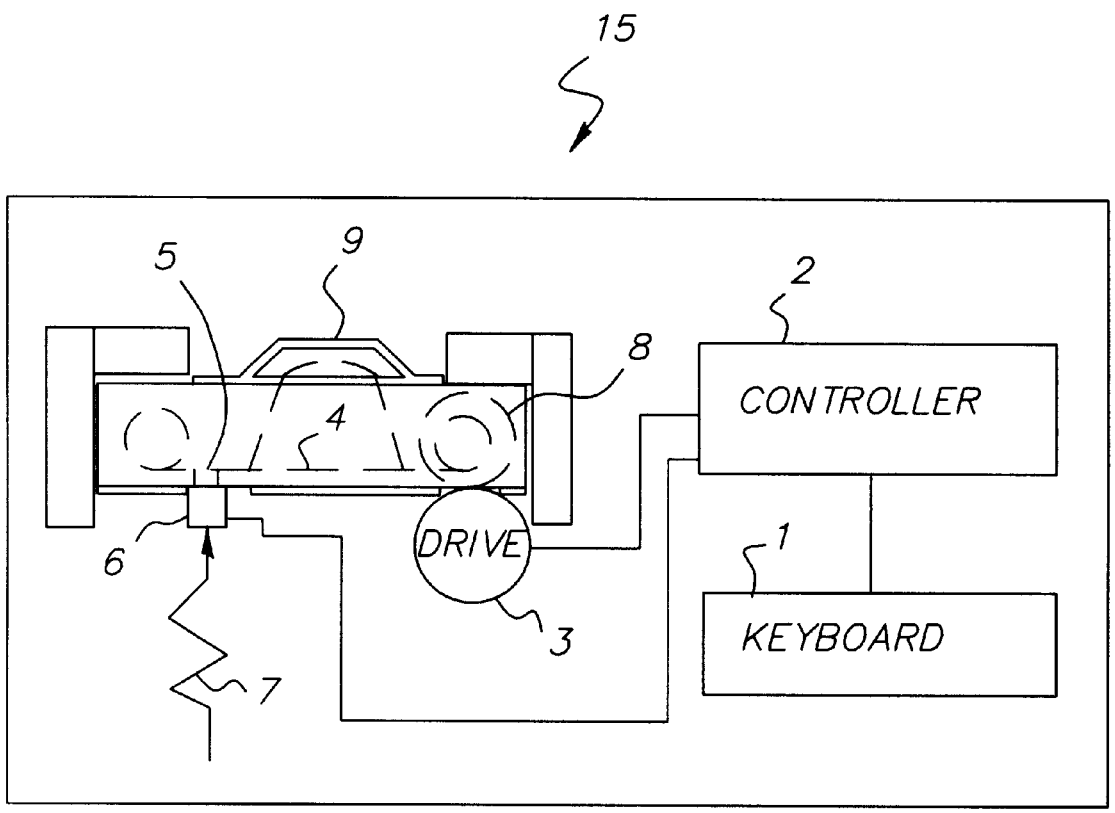
FIG. 1 shows a schematic illustration of a one-time-use camera and interface control assembly or arrangement in accordance with a first embodiment of the present invention.

Referring now to the drawings, in which like reference numerals illustrate identical or corresponding parts throughout the several views, FIG. 1 illustrates an interface control assembly or arrangement 15 and it's interaction with an enabled one-time-use camera 9. With the system of the present invention, one-time-use camera 9 would essentially contain the magnetic recording parts that contact the filmstrip, and it is possible to provide the expensive parts involved with recording information on film outside of or separate from one-time-use camera 9.

As illustrated in FIG. 1, one-time-use camera 9 includes a film advance mechanism 8, as well as a magnetic recording head or device 5. Since camera 9 is a one-time-use camera, it is preferable that magnetic recording device be a low cost device.

As further illustrated in FIG. 1, interface control assembly or arrangement 15 includes a keyboard or other device 1 which permits a user to input information such as photofinishing information. Interface control assembly further includes a central processing unit, computer or controller 2 which is operationally associated with keyboard device 1. Controller 2 is operationally in communication with a film advance drive or film drive mechanism 3, as well as a communication device 6 that provides communication between controller 2 and recording device 5. In a further feature of interface control assembly 15, communication device 6 can include a contact member 7 having a spring which can be adapted to urge magnetic recording device 5 into contact with film 4 in camera 9.

In a first feature of the invention, one-time use camera 9 and specifically, a back portion or rear cover of one-time-use camera 9 should be configured to accept interface control assembly 15 in an operating or recording position so as to enable, for example, the winding of film 4, as well as the transfer of information to be recorded on the film.

In a further feature of the invention, film advance mechanism 8 of one-time-use camera 9 is adapted to be engaged by film advance drive 3 such as a motorized drive of interface control assembly 15. This could be a spur gear on the periphery of a user's winding knob or a separate keyed shaft.

In a still further feature of the present invention, as indicated above, magnetic recording device 5 can be a low cost recording device which can be positioned in a manner to permit filmstrip 4 to pass over the device for recording. As also described above, the back or rear cover of one-time-use camera 9 can be configured such that interface assembly 15 can interface with it in order to drive and control recording device 5 as filmstrip 4 is advanced.

Magnetic recording device 5 can be mounted such that the force provided by contact member 7 will cause recording device 5 in the camera to move into firm contact with filmstrip 4, such that when applied, a good magnetic interface is created, and when released, the motion of the film is not impeded.

As also indicated above, film advance drive 3 can be operationally associated with controller 2. This permits film advance drive 3 to be controlled by controller 2, so that it can provide a constant ,and predictable angular velocity to film advance device 8 in one-time-use camera 9. Therefore, during use of interface control assembly 15, a user will input information into keyboard 1 which is transferred to controller 2. The information is conveyed to communication device 6 that enables interface control assembly 15 to communicate with recording device 5 in one-time-use camera 9. Controller 2 which can be provided with information from keyboard 1, is adapted to convert the information to a standard form, combine this information with pre-stored control characters, run film advance drive 3, and control communication device 6. All of the above operations are coordinated by controller 2, such that the information will be recorded by recording device 5 on filmstrip 4. Controller 2 can be further adapted to communicate with a service provider such as the internet to enable the transfer of information to and/or from the internet via controller 2. For example, if the information which is desired to be recorded on the film is available via the internet, such information can be provided from the Internet to the film via controller 2.

As a further example, when a user input, such as a title, is received from keyboard 1 or downloaded from the internet, controller 2 can create a message with the user's data and such header and trailer characteristics that will satisfy the needs of photofinishing decoding devices that will read and interpret the data. Controller 2 can turn on film advance drive 3 causing filmstrip 4 to be advanced in much the same way that a user would, but in a steady constant velocity motion. As filmstrip 4 moves, controller 2 controls magnetic recording device 5 through communication device 6 such that a desired magnetic recording is made on the filmstrip.

Figure 2A:
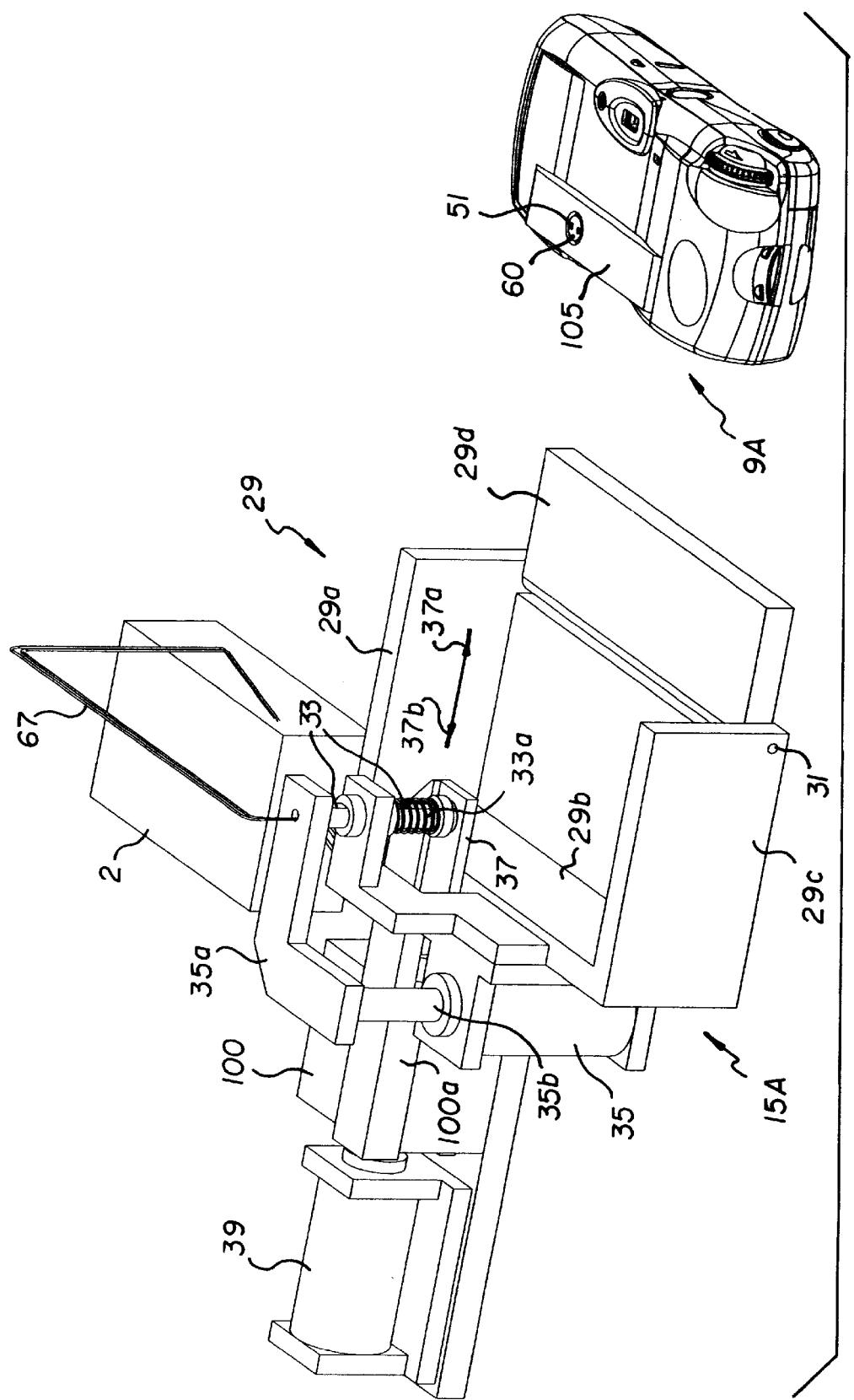
FIG. 2A is a perspective view of a one-time-use camera and an interface control assembly in a further embodiment of the present invention in which the one-time-use camera is not loaded on the interface control assembly.

FIG. 2A illustrates in detail a first embodiment of an interface control assembly 15A which is designed to receive an enabled one-time-use camera 9A. The combination of interface control assembly 15A and enabled one-time-use camera 9A provide for a unique photography arrangement in accordance with a further feature of the invention. As shown in FIG. 2A, interface control assembly 15A includes a receiving member 29 which defines a box-like member having three end walls 29a, 29b and 29c, and a fourth end wall 29d which is hinged at point 31. Hinged end wall 29d can be opened as shown in FIG. 2A to automatically accept an enabled one-time-use camera 9A, such as, from a conveyor belt. As a further option, a user can manually place one-time-use camera 9A in receiving member 29. Interface control assembly 15A also includes a communication device that comprises a contact member 33 which is enabled or adapted to come into contact with the back of one-time-use camera 9A when it is desired to record on film in one-time-use camera 9A. Contact member 33 includes a shaft or rod-like member and is urged in a downward direction by a spring 33a.

Interface control assembly 15A further includes moving mechanisms 35, 39. Moving mechanism 39 can be a motor or a pneumatic type device which is adapted to longitudinally move a member 100 which has an extension 100a with a platform 37 in the directions shown by arrows 37a, 37b. Moving mechanism 35 can be a pneumatic type device or motor which is adapted to move contact member 33 in a direction perpendicular to directions 37a, 37b and opposite to the biasing force of spring 33a. That is, moving mechanism 35 cooperates with a platform 35a that extends from a shaft 35b which moves up and down in accordance with the operation of moving mechanism 35. Platform 35a is attached to a top end of contact member 33 to move contact member 33 in accordance with movement of platform 35a.

In the embodiment of FIG. 2A, contact member 33 is held in a nonengaged or non-recording position by platform 37. When it is desired to load contact member 33 onto the back of one-time-use camera 9A, platform 37 is moved in direction 37a from below contact member 33 by operation of moving mechanism 39, so that spring loaded contact member 33 will press against the back of one-time-use camera 9A.

Figure 3A:
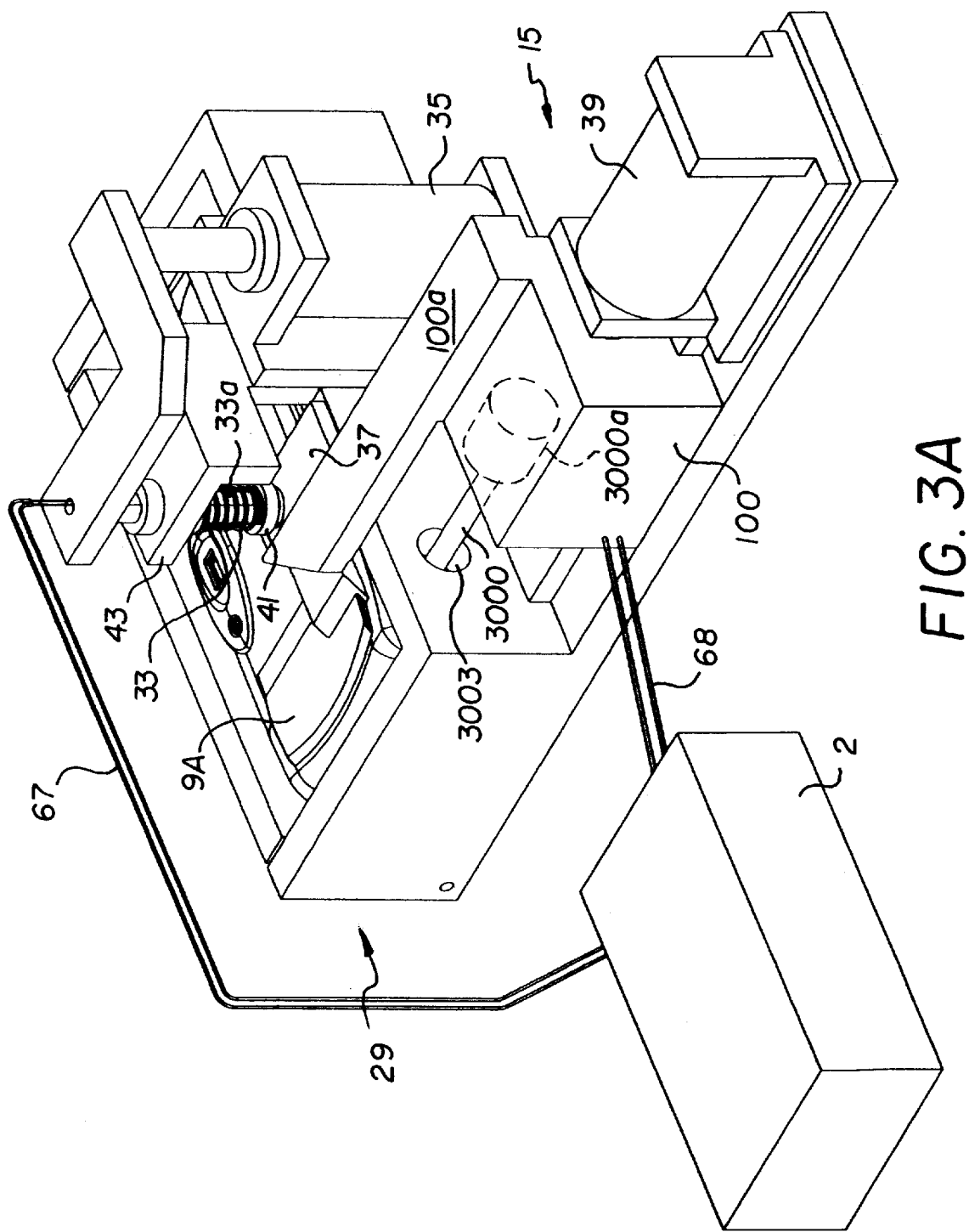
FIG. 3A is a further perspective view of the one-time-use camera loaded in the interface control assembly as shown in FIG. 2C showing connections between a controller and the interface control assembly.

As an alternative to film advance drive 3 of FIG. 1, interface control assembly 15A can include a film advance drive in the form of a drive shaft 3000 (FIG. 3A) which extends from member 100 and passes through an opening 3003 in a wall of receiving member 29. Shaft 3000 is adapted to engage the film cartridge of camera 9A to wind the film. Shaft 3000 can be rotated by way of a motor 3000a which could be positioned within member 100 as shown in FIG. 3A. The winding of the film in the embodiments described above is preferably done in a consistent and controlled manner during recording in accordance with instructions and/or information from controller 2 as described with reference to FIG. 1.

Figure 2B:
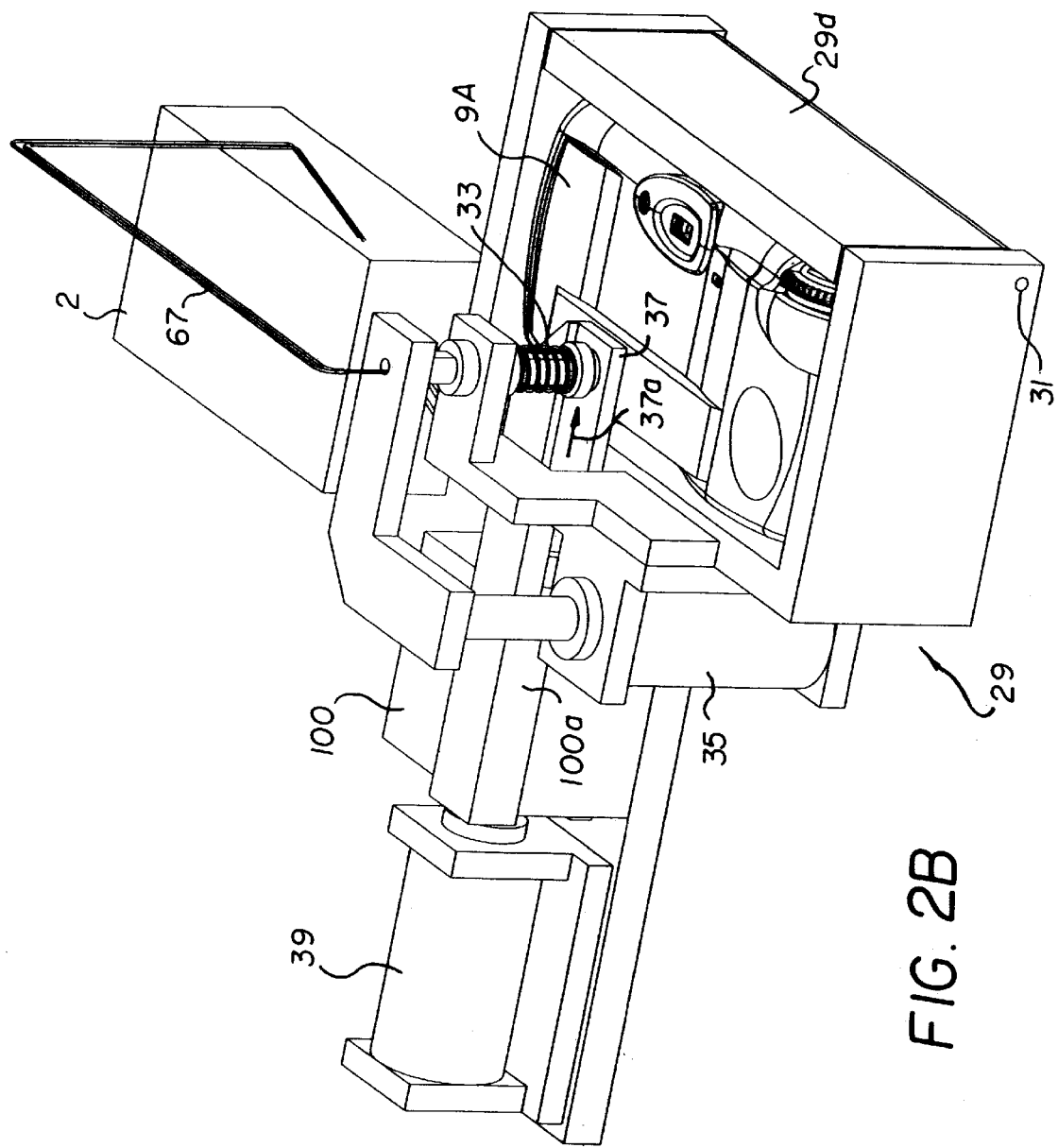
FIG. 2B is a view similar to FIG. 2A with the one-time-use camera loaded in the interface control assembly and a contact member of the interface control assembly being held away from the camera.
Figure 2C:
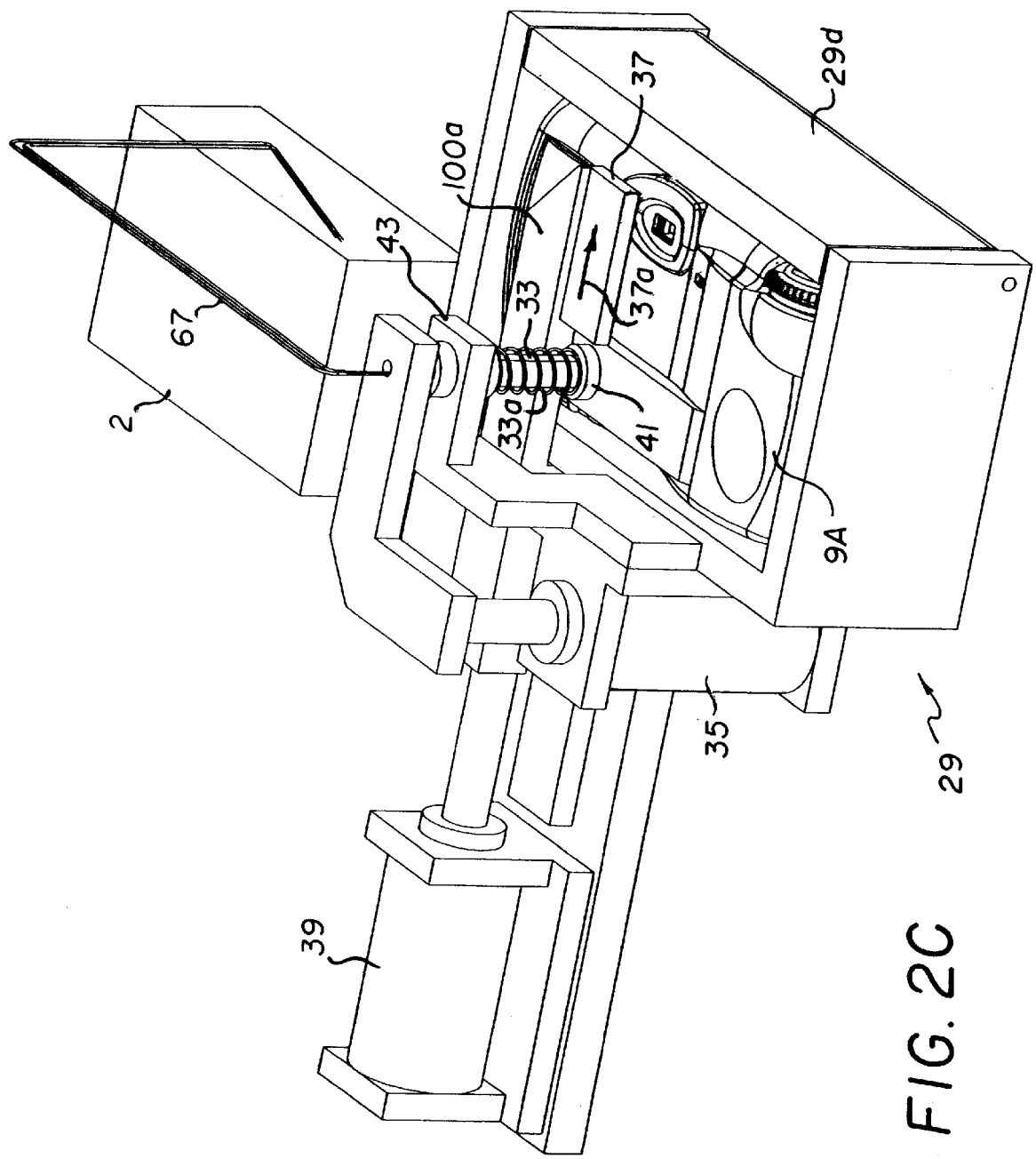
FIG. 2C is a view similar to FIG. 2B with the one-time-use camera loaded in the interface control assembly and the contact member being urged against the one-time-use camera.

During use of interface control assembly 15A and one-time-use camera 9A as illustrated in FIG. 2A, one-time-use camera 9A is loaded onto receiving member 29 as illustrated in FIG. 2B. Once one-time-use camera 9A is loaded onto receiving member 29, end wall 29d is closed so as to hold one-time-use camera 9A within receiving member 29. Thereafter, based on information and/or instructions from controller 2, moving mechanism 39 can be activated to move platform 37 in direction 37a. This permits spring loaded contact member 33 to be urged downward onto the back of one-time-use camera 9A as illustrated in FIG. 2C. Further, based on information and/or instructions from controller 2, the film advance drive in the form of drive shaft 3000 (FIG. 3A) or film advance drive 3 (FIG. 1) can be operated to cause a winding of the film in one-time-use camera 9A as contact member 33 is urged onto the back of one-time-use camera 9A. In a manner which will be explained later, when contact member 33 is urged onto the back of camera 9A (FIG. 2C) it contacts a recording device 60 (FIG. 2A). This causes recording device 60 to move into contact with the film in one-time-use camera 9A.

With regard to contact member 33, as shown in FIG. 2C, moving mechanism 39 can be operated so as to cause a longitudinal movement of platform 37 in direction 37a as shown. Due to the presence of spring 33a which is held between a lower base portion 41 of contact member 33 and an upper stop 43, the force of spring 33a forces contact member 33 downward onto the back of one-time-use camera 9A and into contact with recording device 60. As will be described in detail later, recording device 60 includes, for example, pole pieces which are pushed down by way of the force exerted by contact member 33 into engagement with the film in one-time-use camera 9A for writing on the film.

Figure 3B:
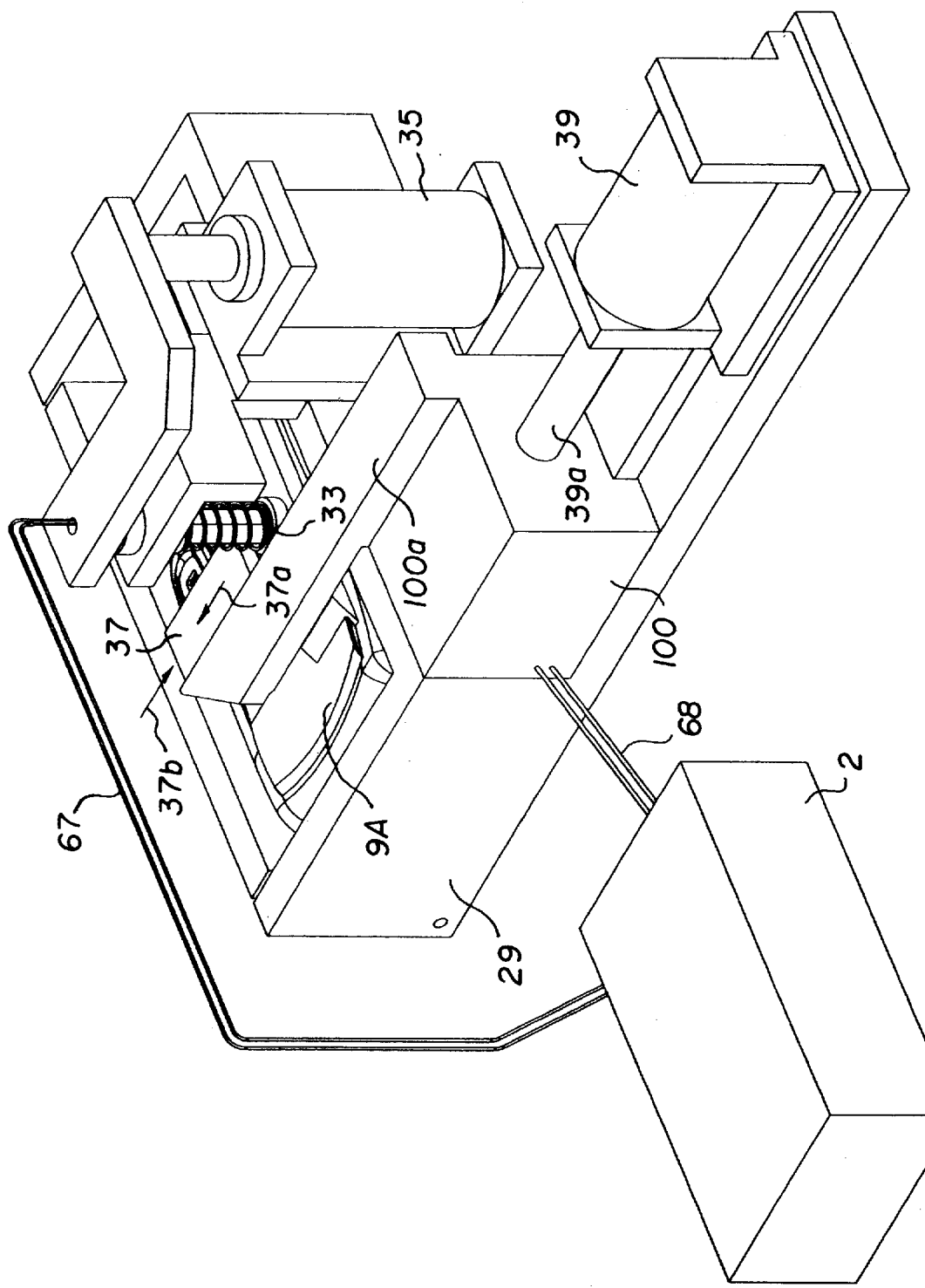
FIG. 3B is a view similar to FIG. 3A with the contact member being urged against the camera.

FIG. 3A is a different perspective view of one-time-use camera 9A mounted in receiving portion 29 of interface assembly 15A. As shown, a lead wire 67 can be provided between controller 2 and contact member 33 to provide an electrical current to recording device 60 via contact member 33. A further lead wire 68 can be provided between controller 2 and interface control assembly 15 via member 100 to provide information and/or instructions to moving members 35 and 39 as well as control the operation of drive shaft 3000. As shown in FIG. 3B, moving mechanism 39 can include a pneumatic rod 39a that is positioned to move member 100 upon activation of moving mechanism 39. As also shown in FIG. 3B, movement of member 100 causes platform 37 to move in direction 37a to permit the urging of contact member 33 onto the back of the camera and urge recording device 60 into a recording position. When recording is completed, moving mechanism 35, which can be a pneumatic device or a motor, can be activated to urge contact member 33 upward against the biasing force of spring 33a and away from the back of camera 9A. This permits recording device 60 to lose contact with the film in camera 9A. When contact member 33 is in an upper position, moving mechanism 39 can be activated to move platform 37 in direction 37b and under a lower end of contact member 33. Thereafter, moving mechanism 35 can be activated so that contact member 33 rests on platform 37 as shown in FIG. 2B.

Figure 4B:
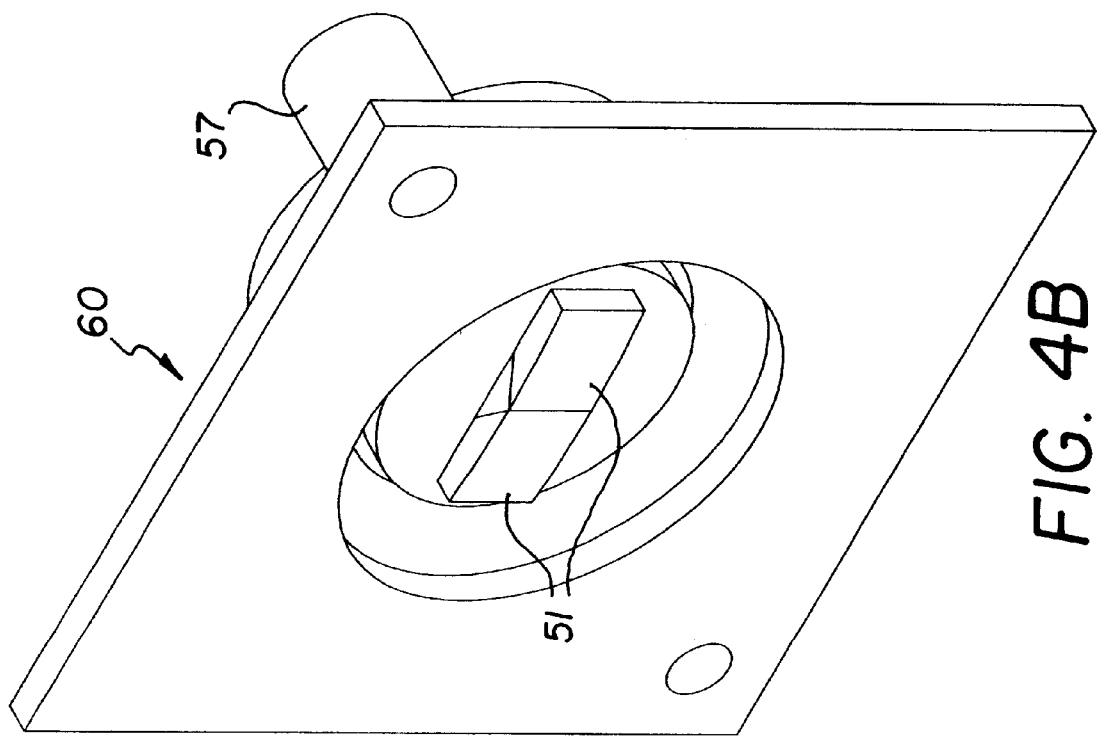
FIGS. 4A–4B are isolated views of a recording device in the form of pole pieces which can be utilized in the one-time-use camera of the present invention.
Figure 4A:
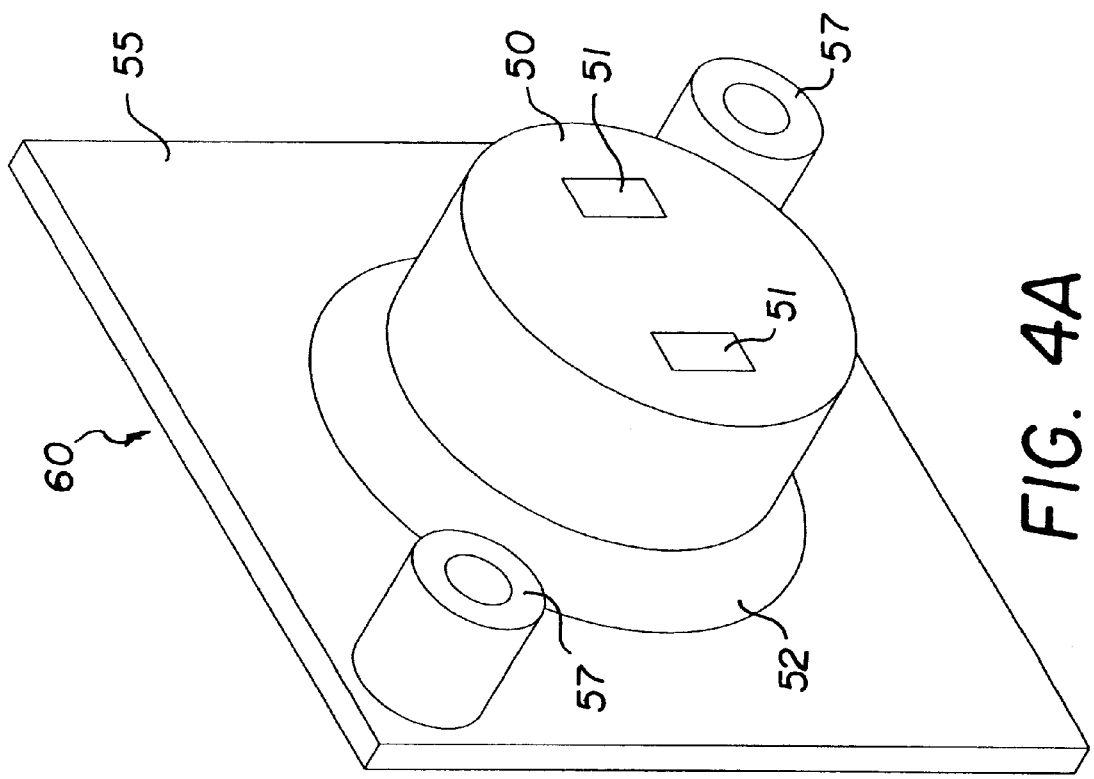

An embodiment of recording device 60 including magnetic pole pieces will now be described with reference to FIGS. 4A, 4B and 5–6. As illustrated in FIGS. 4A–4B, recording device 60 comprises a tubular elastic member 50 having magnetic pole pieces 51 embedded, fitted or attached therein. Of course, the present invention is not limited to an elastic member 50 as shown in FIGS. 4A, 4B and any arrangement which permits the movement of pole pieces 51 in a direction into the camera would be sufficient. Tubular elastic member 50 can optionally include locating boss portions 57. Locating boss portion 57 is beneficial in helping to locate recording device 60 within the inside of the back of a camera as shown schematically in FIG. 8. More specifically, locating boss portion 57 can be utilized as a locating member when mounting recording device 60 within the rear cover of the camera.

Figure 5:
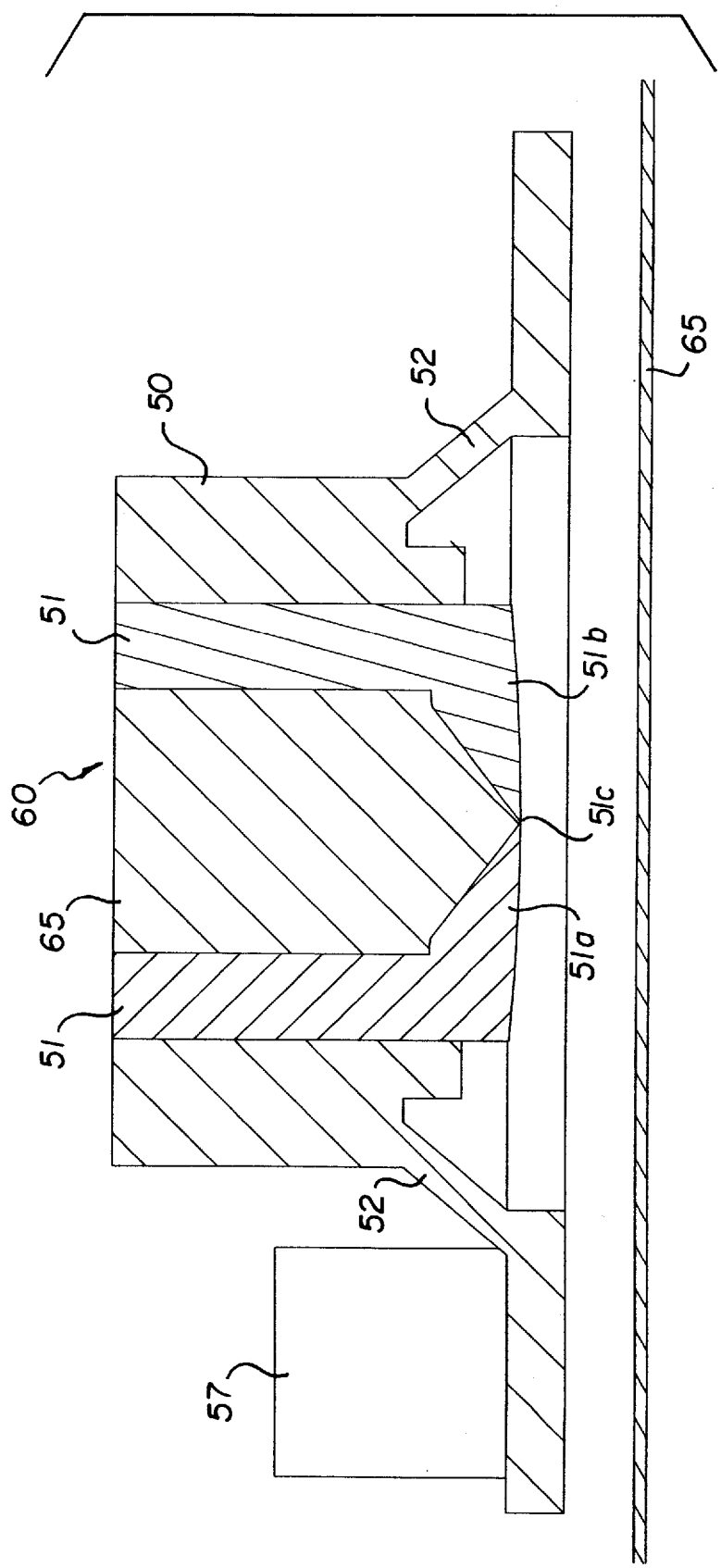
FIG. 5 is a cut-away side view of the magnetic recording device of FIGS. 4A, 4B illustrating the recording device in a relaxed position.

Reference is now made to FIG. 5 which shows a cross section of recording device 60 as illustrated in FIGS. 4A and 4B in a relaxed state. As illustrated in FIGS. 4A, 4B and 5, in a relaxed state, the properties of elastic member 50 permit pole pieces 51 to be separated or spaced from film 65 in a single use camera. Pole pieces 51 are magnetic pieces which generate a magnetic flux when electrical current is applied to them, for the purpose of writing on film 65 in accordance with information and/or directions from controller 2 as shown in FIG. 1. As illustrated in FIG. 5, pole pieces 51 generally include slanted portions 51*a*, 51*b* which define a small gap 51*c* therebetween. Gap 51*c* is effective to create the magnetic flux and preferably should be between 2–5 microns.

Figure 6:
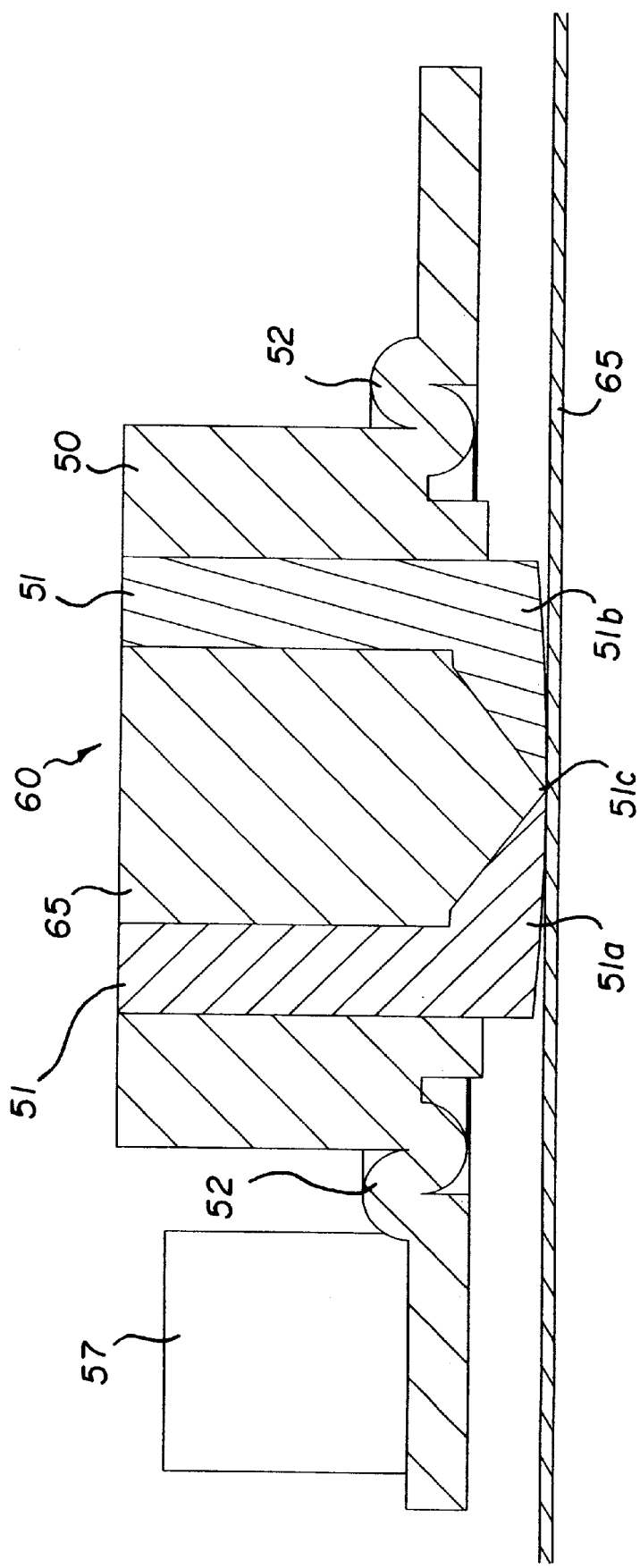
FIG. 6 is view similar to FIG. 5 of the magnetic recording device in which the pole pieces are urged into engagement with the film.

When it is desired to write on film 65, camera 9A is loaded onto receiving member 29 as shown in FIG. 2B. Contact member 33 is then urged against the camera by way of the action of spring 33*a* and the movement of platform 37 as illustrated in FIG. 2C. Contact member 33 will be forced down onto the top 65 (FIG. 5) of recording device 60 so as to bend elastic member 50 at bending portions 52 and urge pole pieces 51 into contact with film 65 as illustrated in FIG. 6. At the same time and in accordance with instructions from controller 2, an electrical field generated from a known source is applied to pole pieces 51 via a leader wire 67 (FIG. 2C) which extends through contact member 33 to create a magnetic flux and thereby cause a writing or recording on film 65.

Figure 7A:
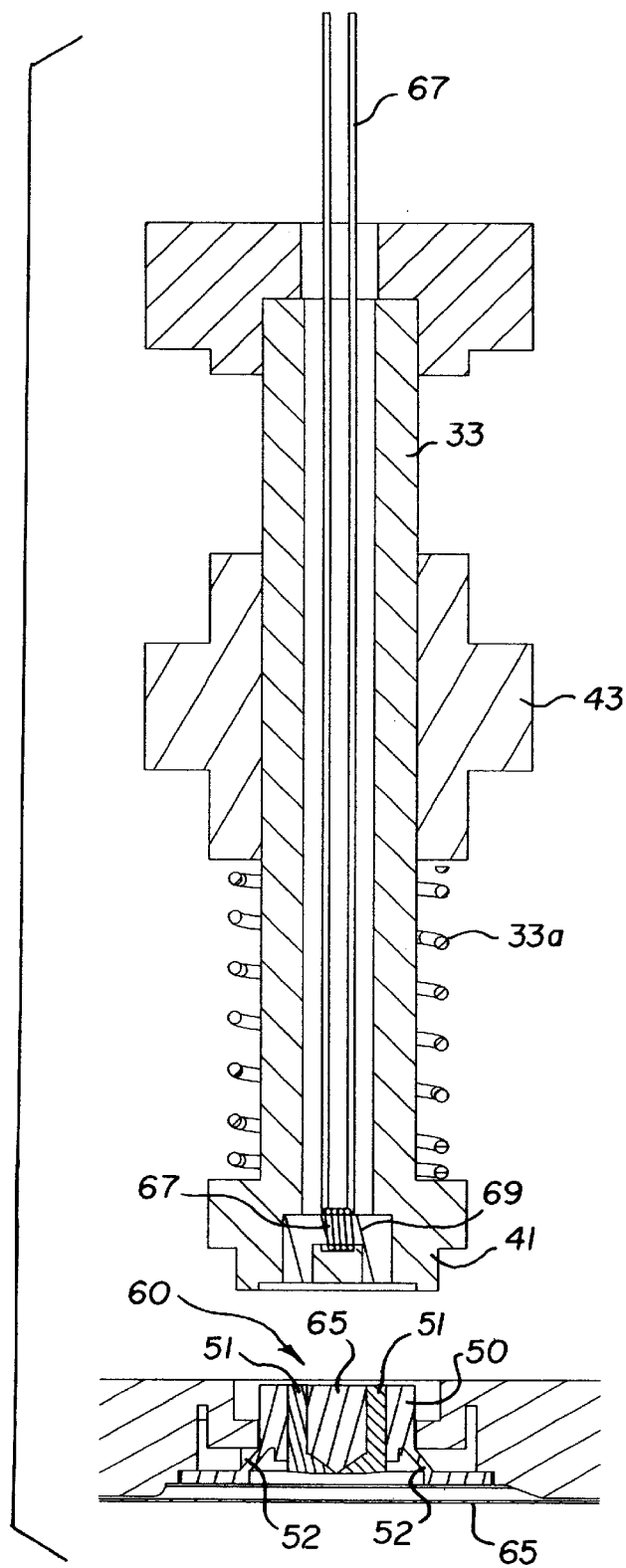
FIG. 7A is a detailed view of the contact member of the interface control assembly of the present invention.
Figure 7B:
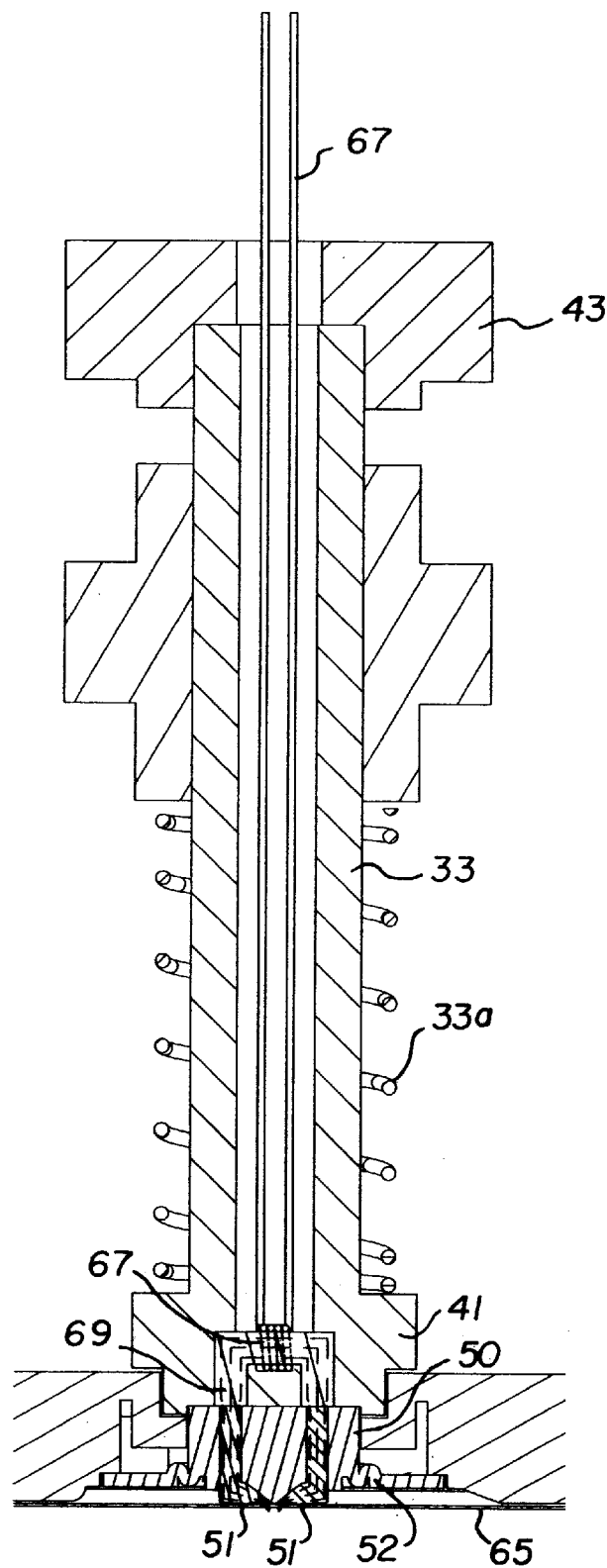
FIG. 7B is a view similar to FIG. 7A with the recording device being urged against the film by the contact member.

This is more clearly seen in FIGS. 7A–7B which show the relationship and inter-engagement between contact member 33, pole pieces 51 and recording device 60. More specifically, as shown in FIG. 7A, leader wire 67 is coiled about a lower portion 69 at the bottom of contact member 33 and an electric current is applied to leader wire 67. When urged into engagement with pole pieces 51 (FIG. 7B), the current is transferred to the pole pieces 51 to create magnetic flux lines as shown in FIG. 7B which is used to write onto film 65.

Figure 8B:
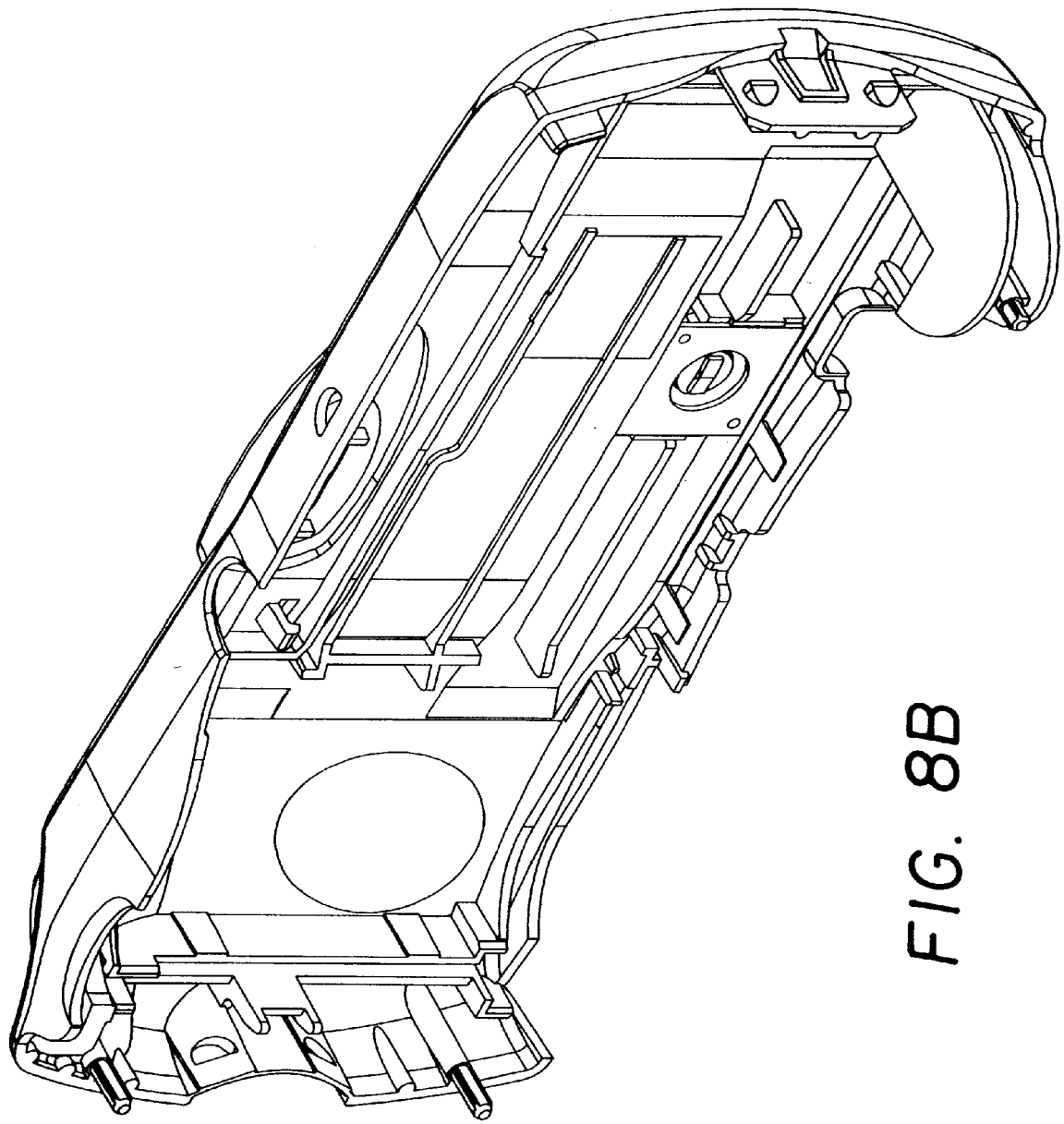
FIG. 8B shows the rear cover of the camera of FIG. 8A.
Figure 8C:
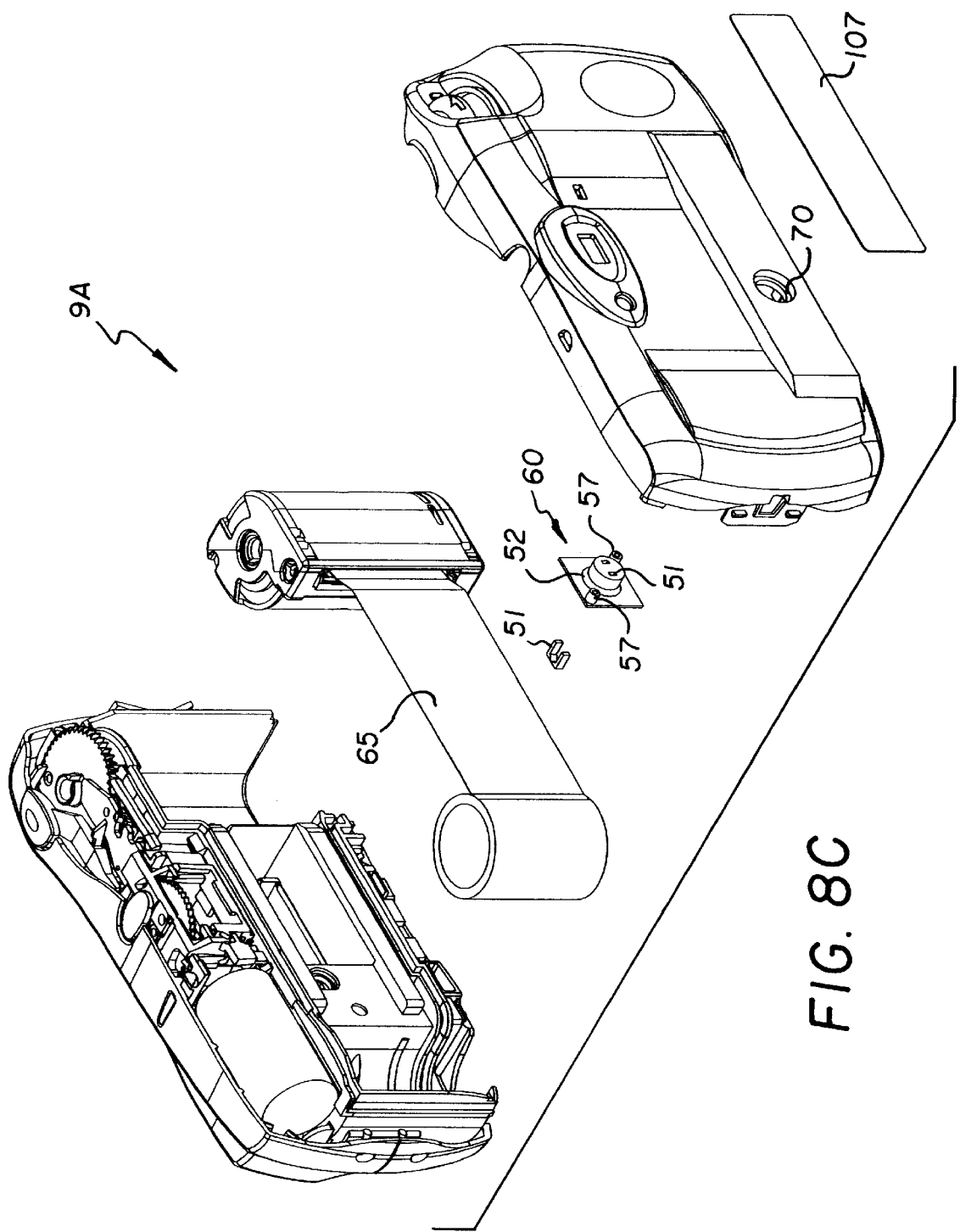
FIG. 8C is an exploded view of the camera of FIG. 8A from a different perspective.
Figure 9A:
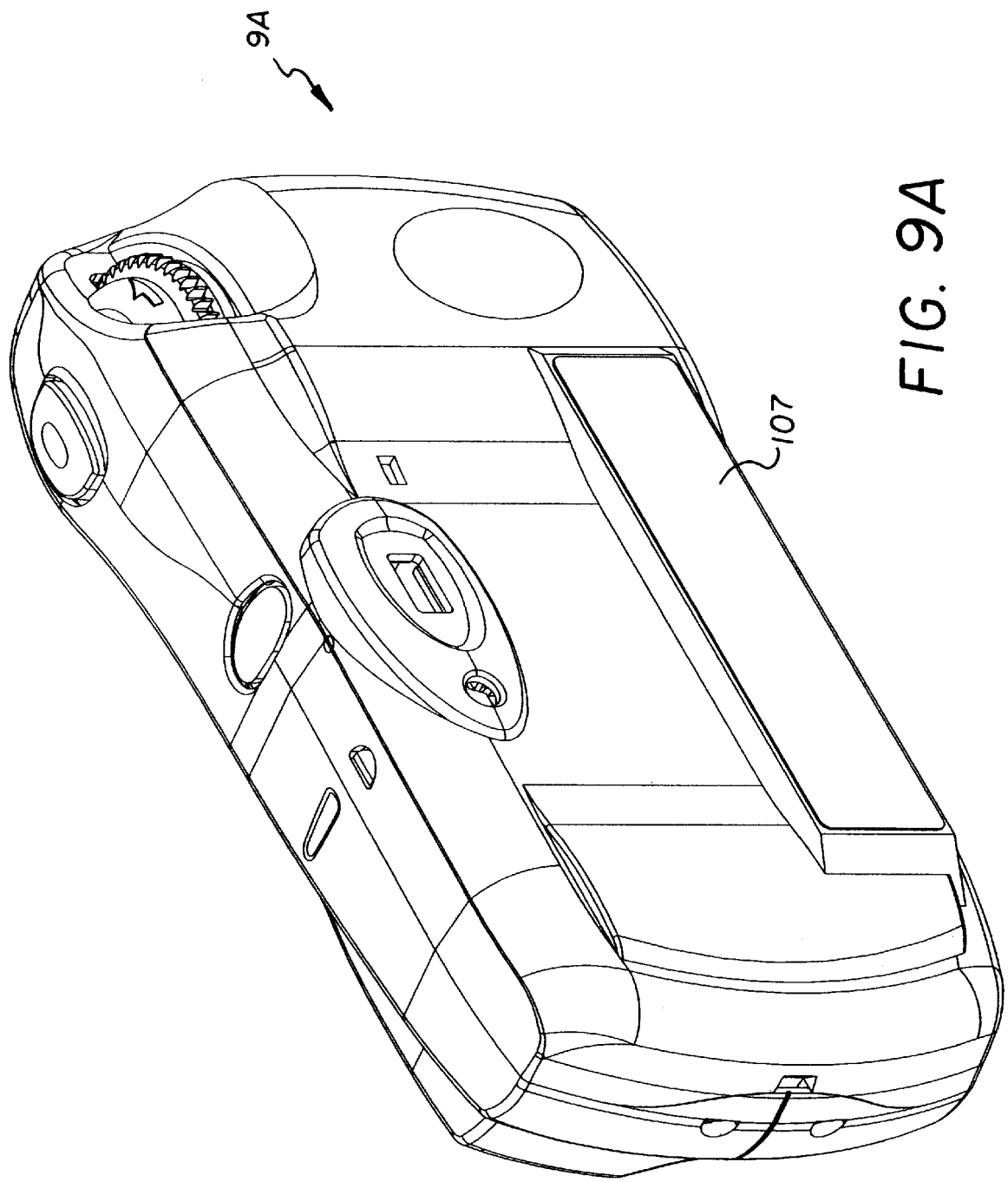
FIG. 9A is a further perspective view of the enabled one-time-use camera as shown in FIG. 8A.

With reference back to FIG. 2A, in one embodiment of an enabled one-time-use camera 9A, recording device 60 could be positioned on the back of the camera and mounted within a frame-like member 105. One end of magnetic pole pieces 51 and elastic member 50 would be visible from outside the camera and the opposite end would extend into the camera toward the film. This arrangement facilitates contact with contact member 33. As illustrated in the exploded views of FIGS. 8A and 8C and the perspective view of FIG. 8B, an inside 27*a* of the back portion or rear cover of camera 9A can include an opening 70 which is sized to receive elastic member 50 having pole pieces 51 embedded, attached or fitted therein. Boss portion 57 can be beneficial in cooperating with corresponding portions on the back of the camera to effectively hold and maintain elastic member 50 in place. In a feature of this invention, elastic member 50 in a relaxed state will generally slightly protrude from the back of the camera as shown in FIGS. 2A and 9B. As illustrated in FIGS. 8A, 8C and 9A, a label 107 can optionally be positioned over the relaxed elastic member 50 so as to cover the protruding elastic member 50 and magnetic pole pieces 51. When writing onto film in the camera, contact member 33 can be abutted against the area of label 107 which corresponds to the area where the elastic member protrudes out from the back of the camera so as to move pole pieces 51 into the camera and into contact with the film for writing on the film. FIG. 9B shows a portion of label 107 removed to more easily view the spatial relationship between cover 107 and recording device 60.

The arrangement of the present invention can be part of an automated mechanized conveyor system in a plant which feeds cameras to one or more interface control assemblies 15, 15A, such that a plurality of one-time-use cameras can be provided with recorded information. As a further option, the arrangement can be provided in a retail environment which permits the customization of the one-time-use cameras in accordance with a customer's request.

In the above described embodiments, magnetic recording is provided by recording device 60 located substantially within one-time-use camera 9A. Electrical contacts on the camera can allow the components of the interface control assembly to be outside of the camera and for the appropriate components of the assembly to power and control the action of recording device 60 inside one-time-use camera 9A as film 65 is transported. Recording device 60 is utilized in a typical fashion by applying current through the coil.

Figure 10:
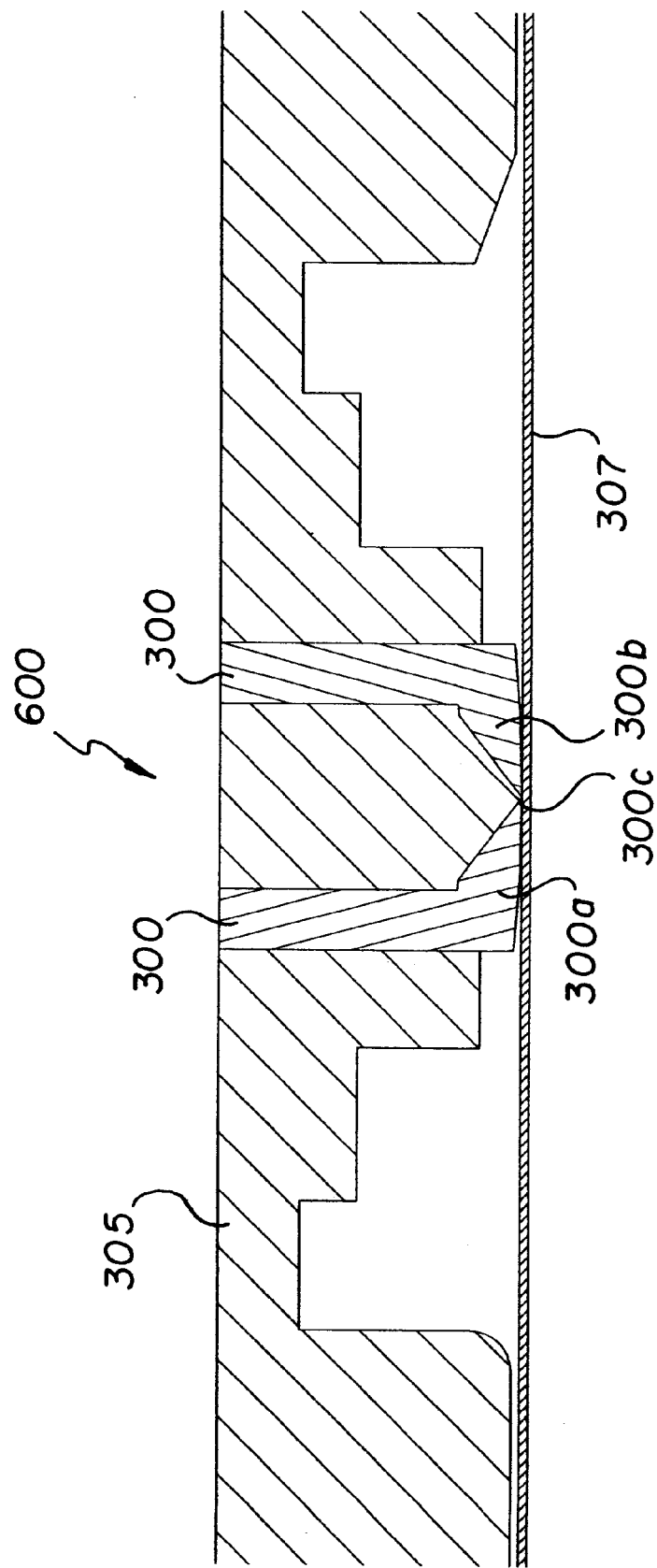
FIG. 10 shows a further embodiment of a recording device in accordance with the present invention.
Figure 11:
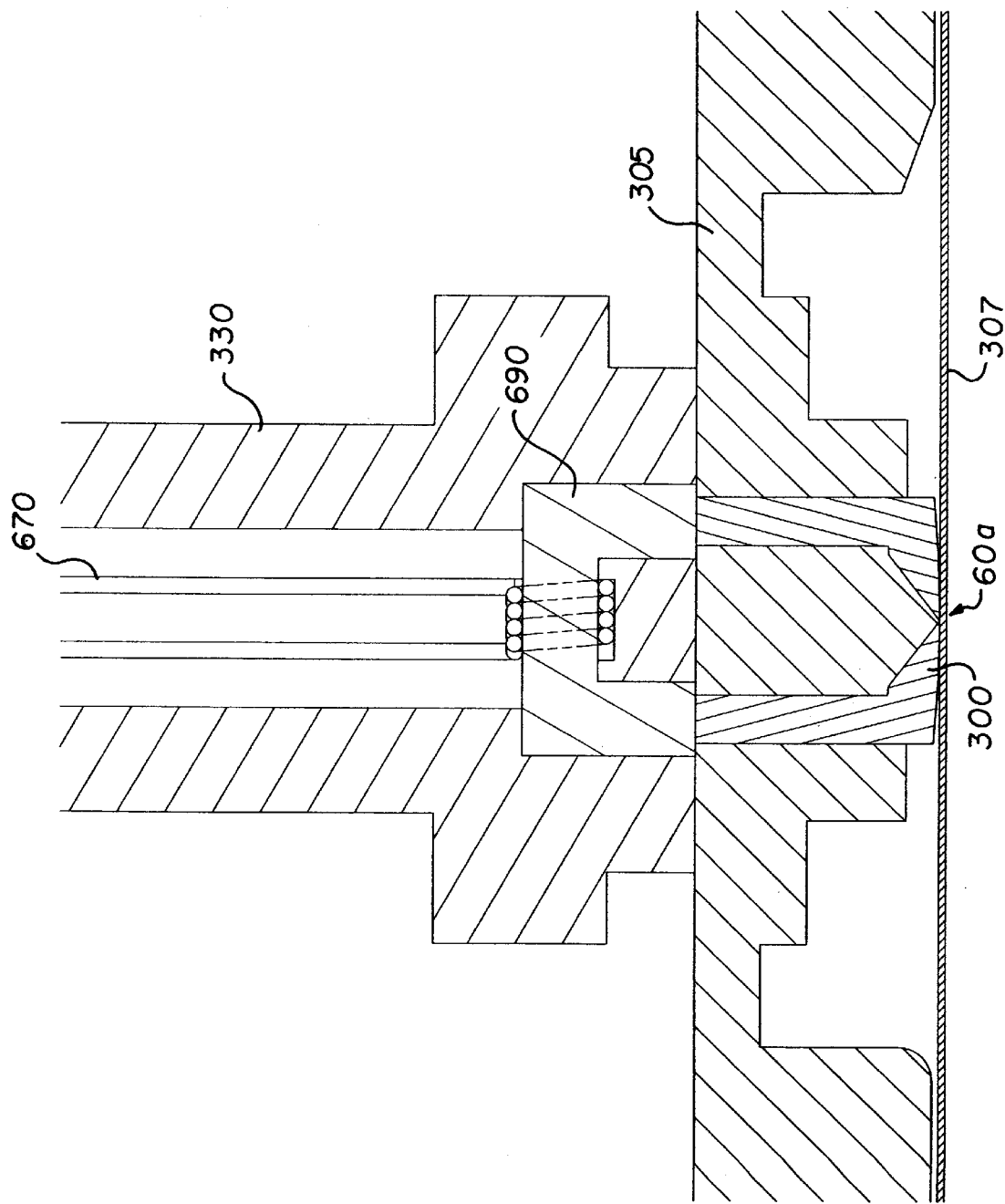
FIG. 11 is a view of the recording device of FIG. 10 cooperating with a contact member.
Figure 12:
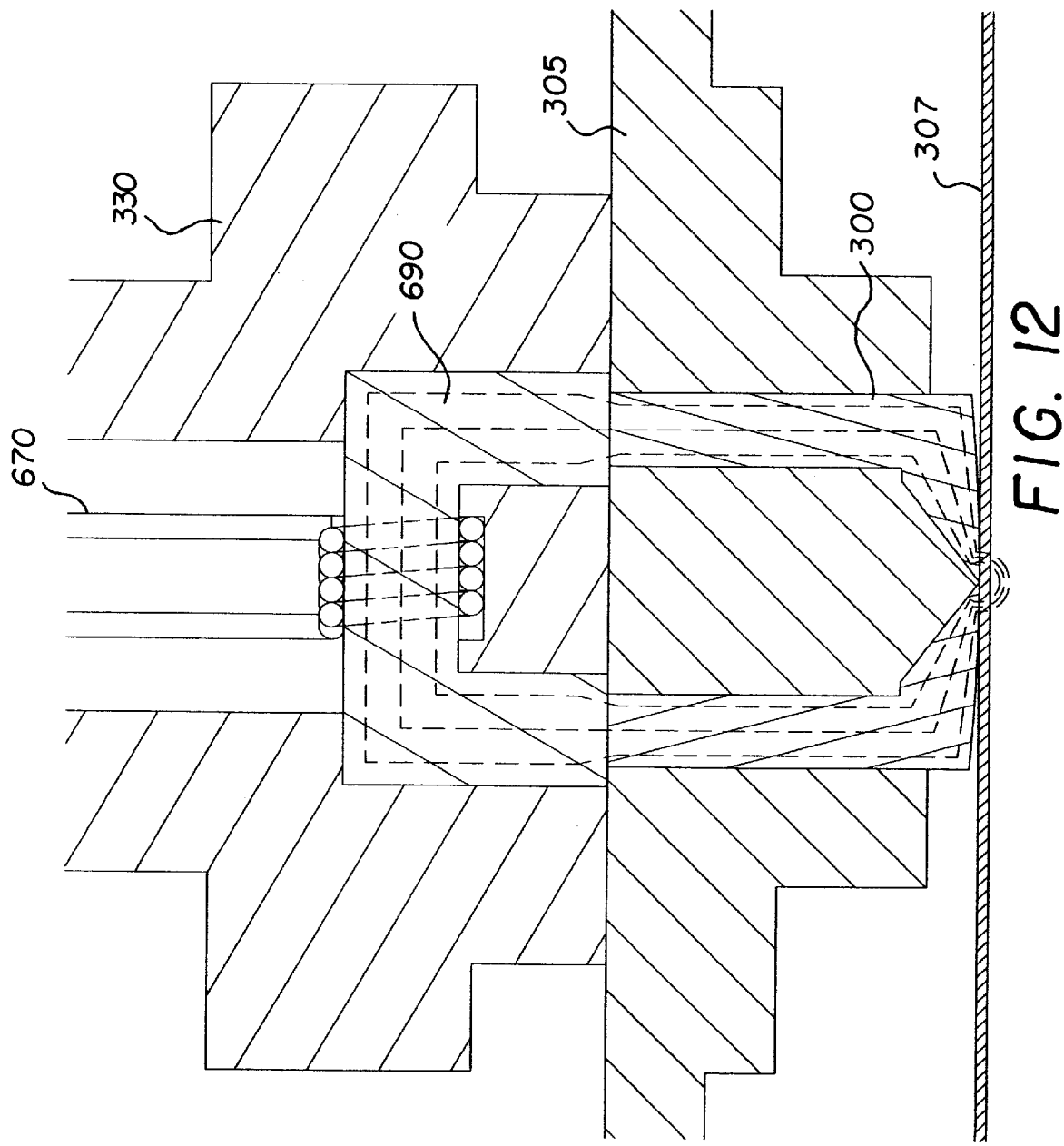
FIG. 12 is a further view similar to FIG. 11 illustrating the created magnetic flux lines.

FIG. 10 illustrates an alternate embodiment of the recording device of the present invention. As illustrated in FIG. 10, a recording device 60*a* would include basically only pole pieces 300 which would be embedded, attached or fitted into the back of a camera 305. Pole pieces 300 would extend through the back of the camera and be in constant contact with film 307. Therefore, in the embodiment of FIG. 10, one end of pole pieces 300 would be visible from the back of the camera, while the other end of pole pieces 300 would be in constant contact with film 307. Unlike recording device 60 as illustrated in FIG. 5, recording device 60*a* would not include a tubular elastic member which enables the recording device to be movable between a position in contact with the film and a position spaced away from the film. Like pole pieces 51 of recording device 60, pole pieces 300 of recording device 60*a* would include slanted end pieces 300*a*, 300*b*, as well as a gap 300*c* therebetween. In the embodiment of FIG. 10, it is further noted that pole pieces 300 would be configured so that no light would leak around them. With the recording device 60*a* as illustrated in FIG. 10, a communication device which comprises a contact member 330 as shown in FIG. 11 can be used. The difference between contact member 330 of FIG. 11 and contact member 33 as shown in, for example, FIG. 7A, is that there would not be a necessity to urge the recording device 60*a* into contact with film 307 since the recording device 60*a* is already in contact with film 307. Thus, it would only be necessary to lower contact member 330 toward the back camera 305 such that lower portion 690 having lead wire 670 coiled around it would make contact with pole pieces 300 as illustrated in FIG. 11. With the embodiment of FIG. 11, like the previous embodiment, a passage of an electric current through lead wire 670 will cause a magnetic flux between pole pieces 300 so as to permit writing on film 307 in the same manner as described above with respect to, for example, FIG. 7B. The difference between the embodiment of FIGS. 10 and 11 and the embodiment as shown in, for example, FIG. 7B is that the pole pieces are embedded fitted or attached to the back of camera 305 and are maintained in constant contact with film 307. FIG. 12 illustrates the magnetic flux line that would be created upon the application of an electrical current via lead wires 670 coiled around lower portion 690.

Figure 13:
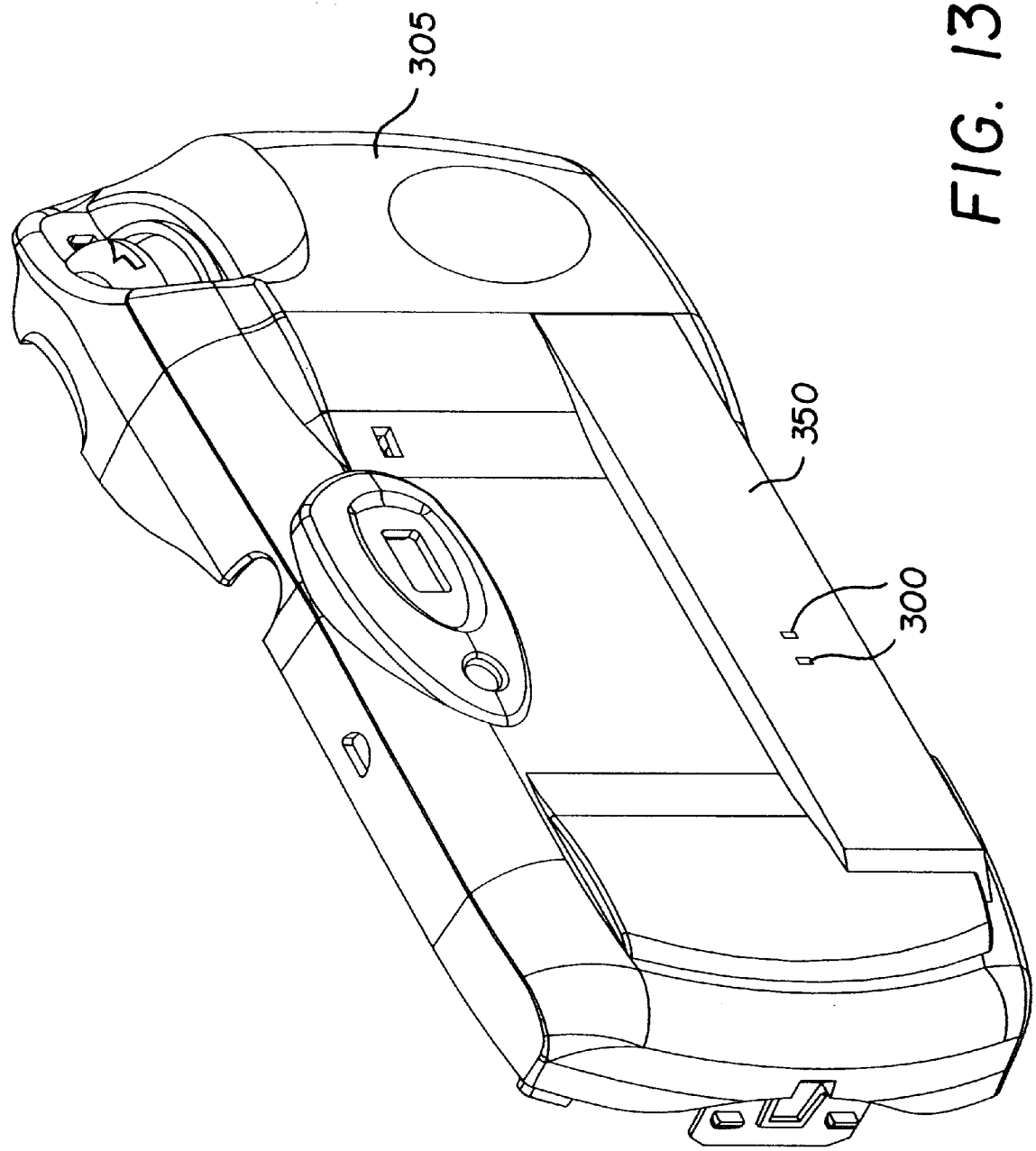
FIG. 13 is a view of a rear portion or cover of the camera having the recording device illustrated in FIGS. 10–12.

FIG. 13 illustrates the view from the rear cover of camera 305 having a recording device 60*a* as illustrated in FIG. 10.

As shown in FIG. 13, the rear cover of camera 305 would include a flat portion 350 through which the top portion of pole pieces 300 would be exposed. As described above, when recording on camera 305, the contact member 330 (FIG. 11) would be lowered so as to contact pole pieces 300.

Figure 14:
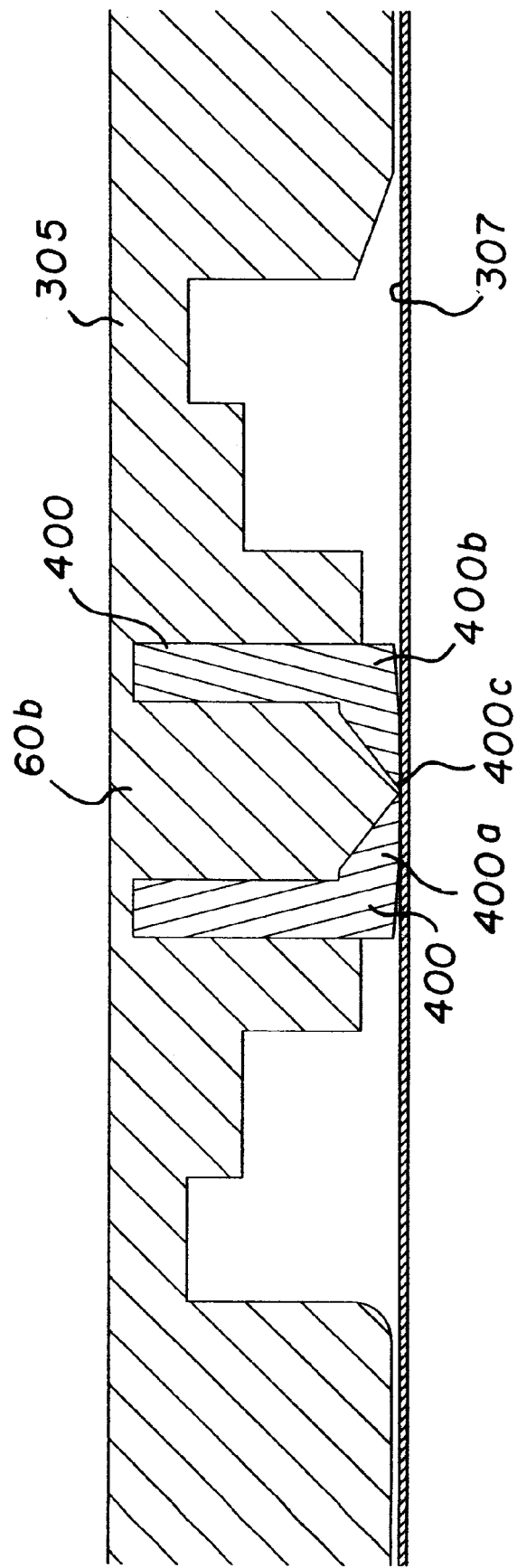
FIG. 14 is a cut-away side view of a further embodiment of a recording device in accordance with the present invention.
Figure 15:
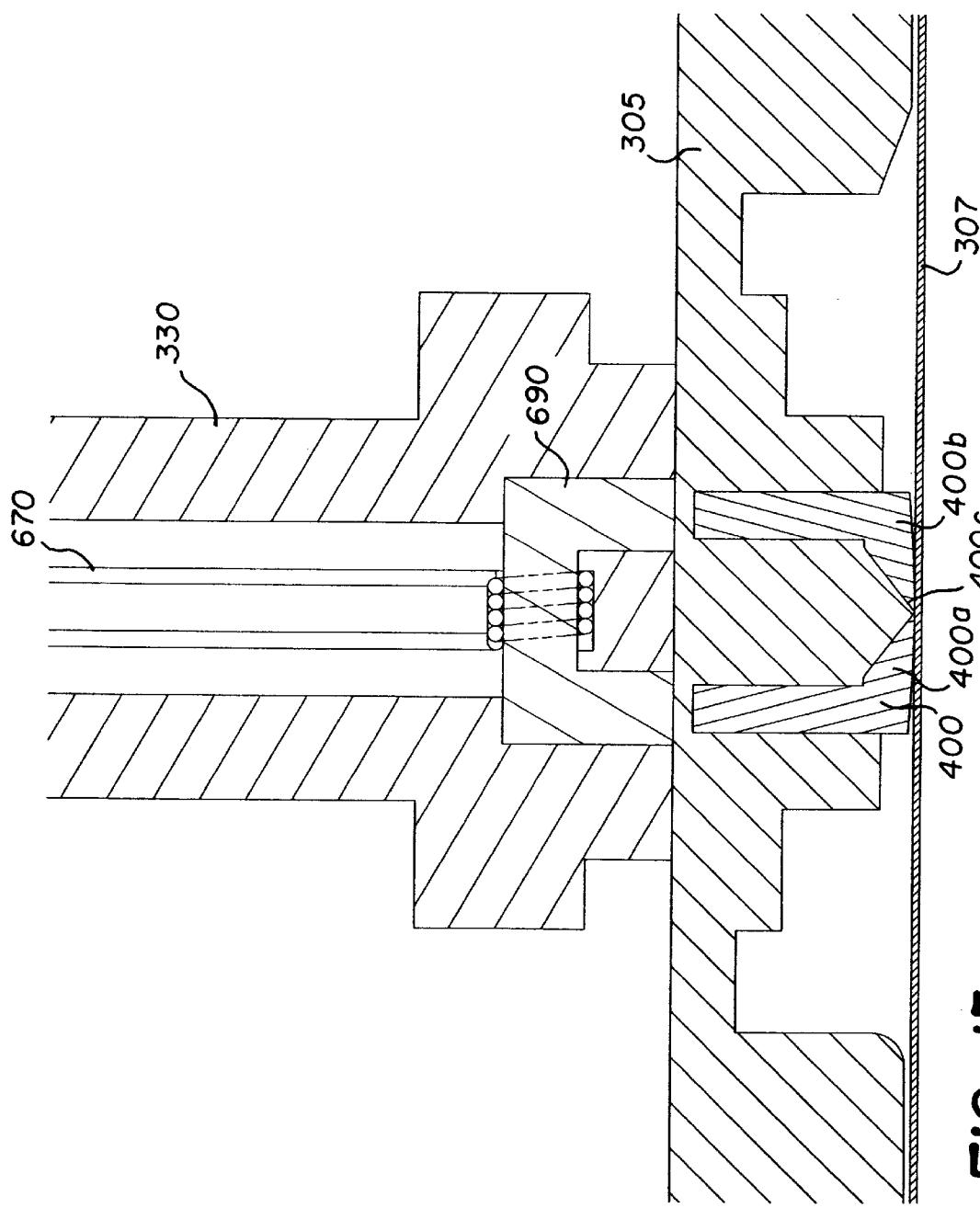
FIG. 15 is a view of the recording device of FIG. 14 cooperating with a contact member.

FIG. 14 illustrates a further embodiment of a recording device which can be utilized in the present invention. In FIG. 14, recording device 60b includes pole pieces 400 which are arranged to contact the back surface of film 307 but do not extend through the back wall of camera 305. Pole pieces 400 would include slanted portions 400a, 400b, similar to the embodiment of FIG. 10, as well as a gap 400c. However, unlike the embodiment of FIG. 10, pole pieces 400 do not extend through the back wall of camera 305. FIG. 15 illustrates contact member 330 in contact with the back surface of camera 305, for recording on film 307. As in the previous embodiment, an electrical current is applied via lead wire 670 which is coiled about lower portion 690. This creates a magnetic flux which passes through the back surface of camera 305 and through pole pieces 400 for writing on film strip 307. See for example, FIG. 12, for an illustration of the magnetic flux lines created by the passing of electrical current through lead wire 670.

Figure 16:
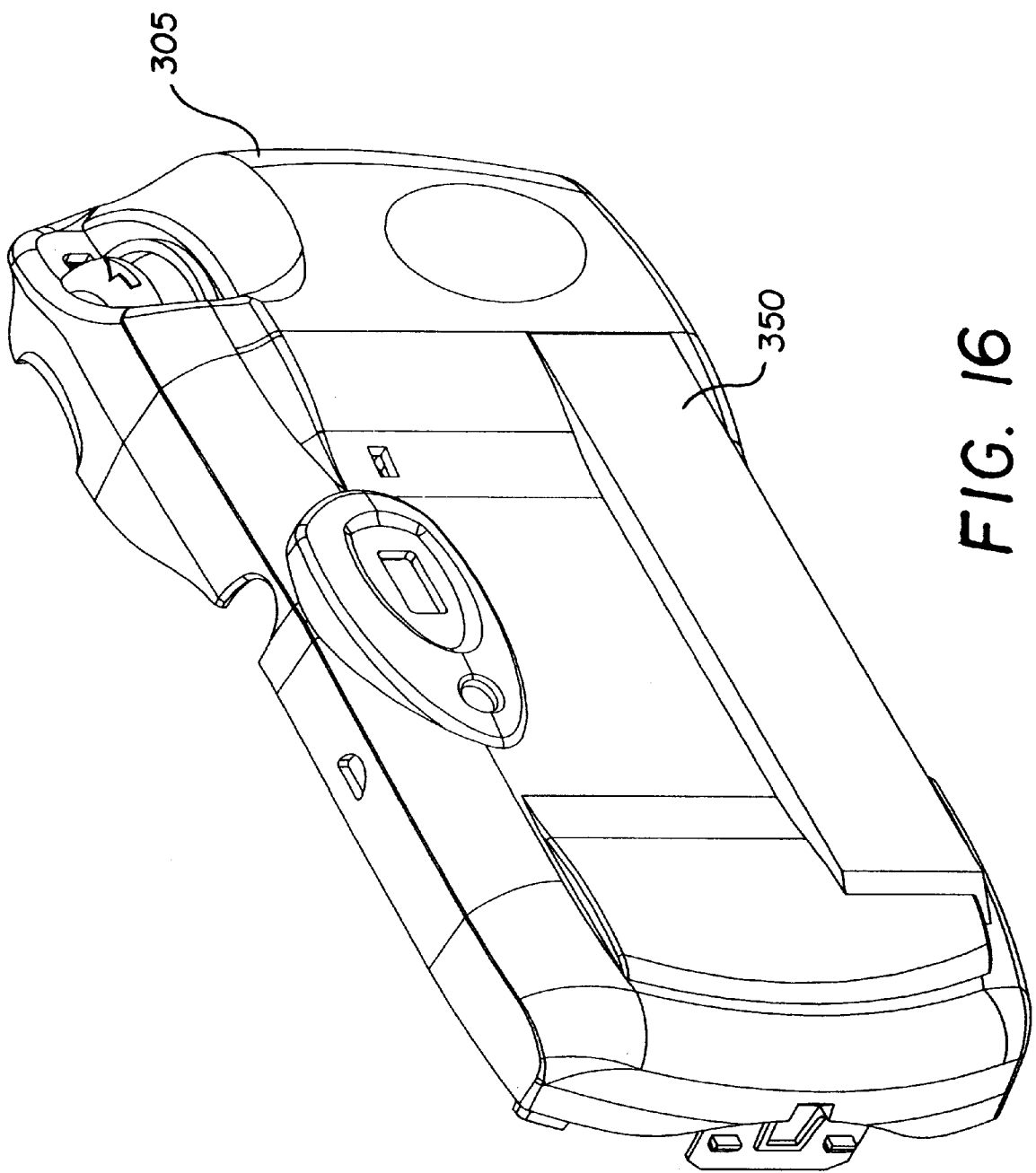
FIG. 16 is a view of the rear portion or cover of an enabled camera having the recording device of FIG. 14.

FIG. 16 illustrates a back surface of camera 305 having recording device 60b. With recording device 60b as illustrated in FIG. 16, the pole pieces would not be visible from the back of camera 305. Further, like the embodiment of FIG. 10, pole pieces 400 are in constant contact with film 307.

An advantage of recording device 605 as shown in FIG. 14 is that the need for eliminating light control through the light passage between the pole pieces and the camera back is not needed and no external contacts are present or visible. The interface control assembly would be similar to the previous embodiment except that the magnetic flux would be coupled into the pole pieces without direct contact between the flux creator (i.e. contact member 333) (external to the one-time-use camera) and the pole pieces enclosed in the one-time-use camera. The pole pieces would be buried inside the camera never passing through the plastic wall of the camera back.

Figure 17:
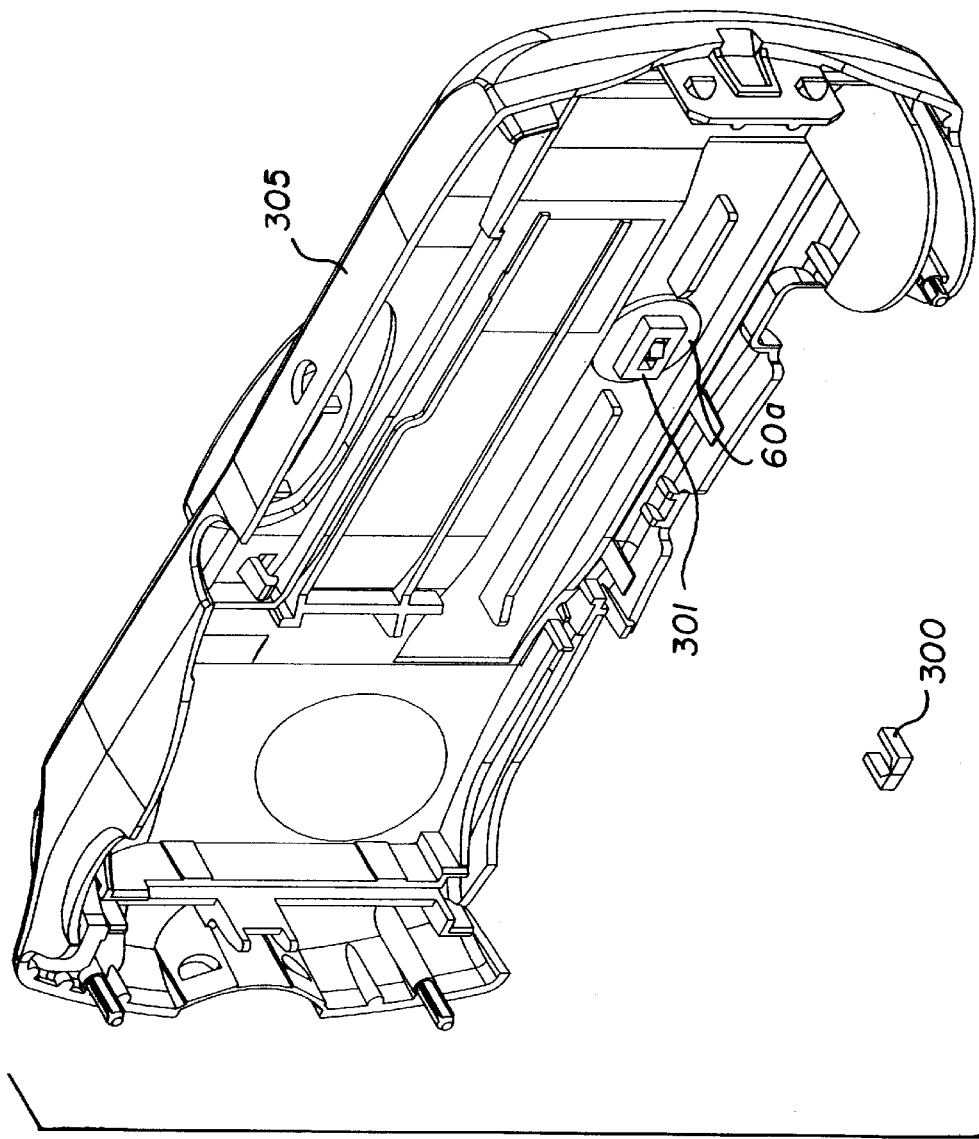
FIG. 17 is an inside view of the rear cover of an enabled camera having a recording device as shown in FIG. 10.
Figure 18:
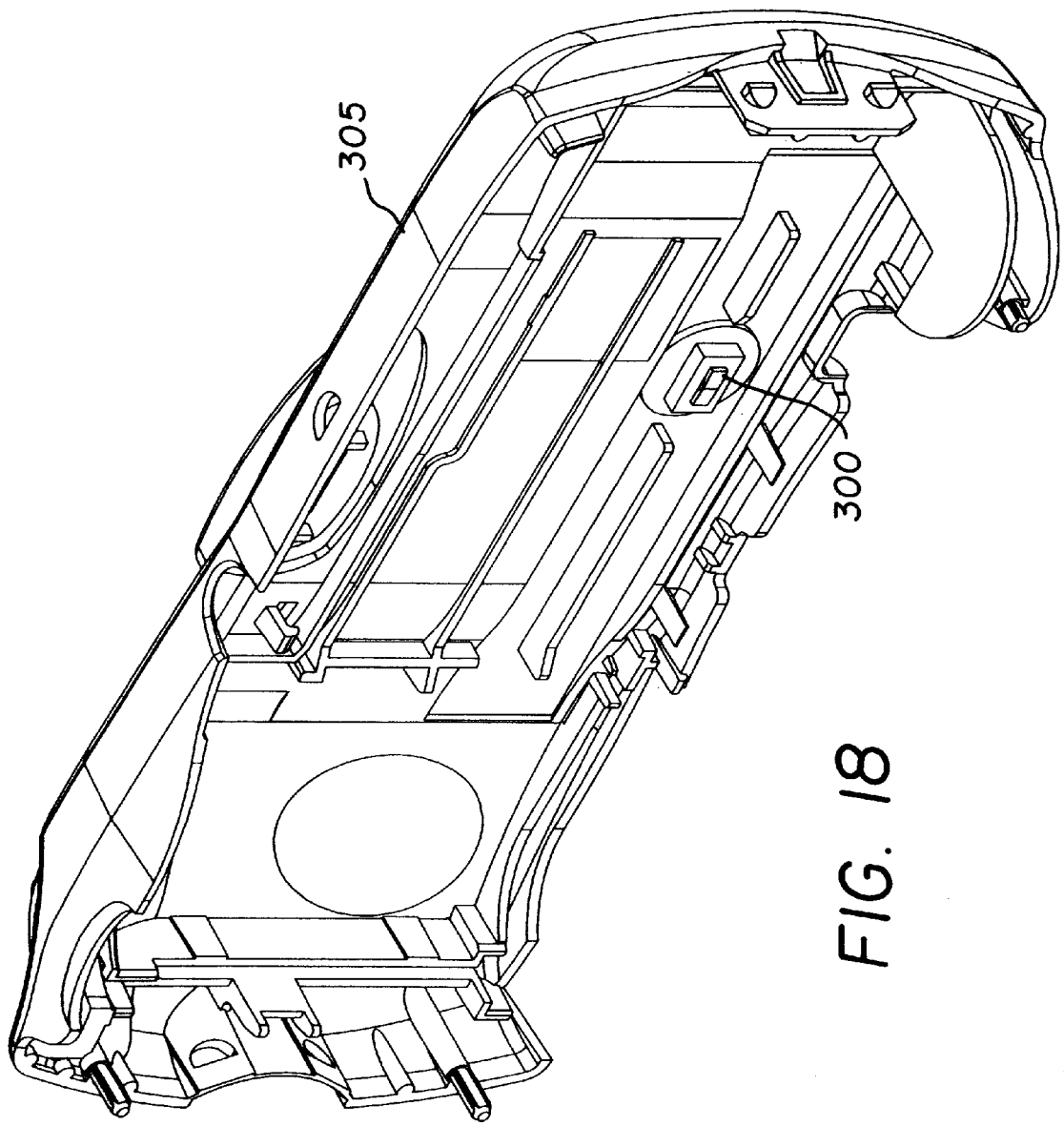
FIG. 18 is a view similar to FIG. 17 showing the recording device mounted on the rear cover of the camera.

FIGS. 17–18 illustrate an interior portion of camera 305 to illustrate as an example, recording device 60a. As shown in FIGS. 17 and 18, the pole pieces 300 would basically be embedded attached or inserted into a block member 301 in the back of the camera such that when assembled, it would have the configuration illustrated in FIG. 18. For recording device 60a, the pole pieces 300 would extend through the back wall of camera 305 as shown in FIG. 13. It is recognized that for recording device 60b, the pole pieces 400 would basically be shorter and would not extend through the back of camera 305 (see FIG. 16). In both instances, the pole pieces are in constant contact with the film, and record via the passage of an electrical current through contact member 330.

Figure 19:
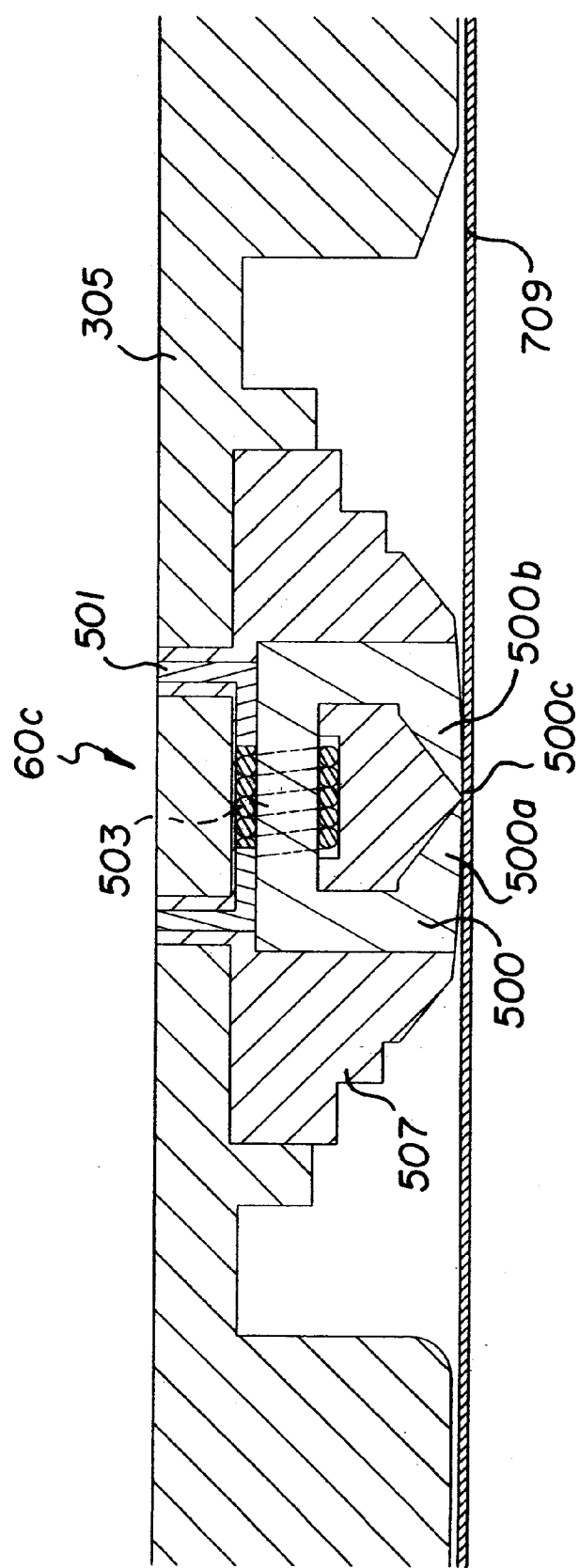
FIG. 19 is a cut-away side view of a still further embodiment of a recording device in accordance with the present invention.

FIG. 19 illustrates a further embodiment of a recording device in accordance with the present invention. In the embodiment of FIG. 19, recording device 60c basically would be a complete magnetic head mounted in a rear cover of camera 305. In the embodiment of FIG. 19, recording device 60c includes pole piece 500 mounted within a support member 507 fitted in a hole in the rear of camera 305. Recording device 60c further includes a conductive member 501, as well as a coil 503 wrapped around pole piece 500 and conductive member 501. Conductive member 501 extends from the top of pole pieces 500 toward the back of camera 305 as shown. Further, pole piece 500 like the previous embodiments would include slanted ends 500a, 500b, as well as a gap 500c.

Figure 20:
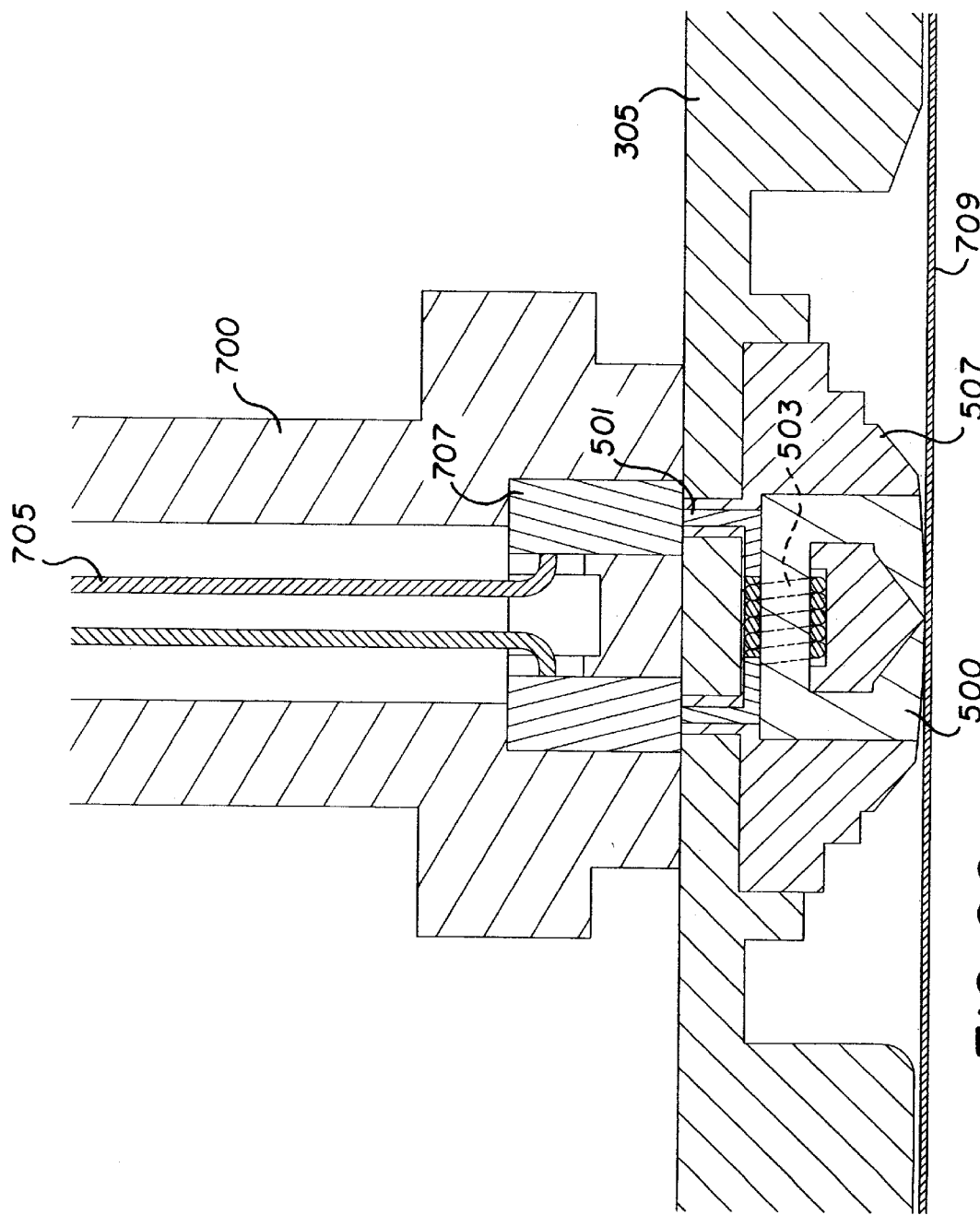
FIG. 20 is a view of the recording device of FIG. 19 cooperating with a contact member.

With the embodiment of FIG. 19, a communication device that comprises a contact member 700 (FIG. 20) could be based on the previous described contact members but would not include a coil at the end of the lead wires since the coil would be part of recording device 60c. Therefore, as shown in FIG. 20, contact member 700 would include lead wires 705 which lead to a conductive member 707. When contact member 700 is positioned onto the back of camera 305 as shown in FIG. 20, conductive member 707 abuts against conductive member 501 of recording device 60c so as permit the passage of an electrical current into coil 503 and further, the creation of a magnetic flux for recording on film 709. Although the embodiment of FIGS. 19 and 20 show the pole pieces in contact with film 709, the embodiment could be modified to include an elastic member as illustrated in FIG. 7A, to permit a movement of recording device 60c into and out of contact with film 709.

Figure 21:
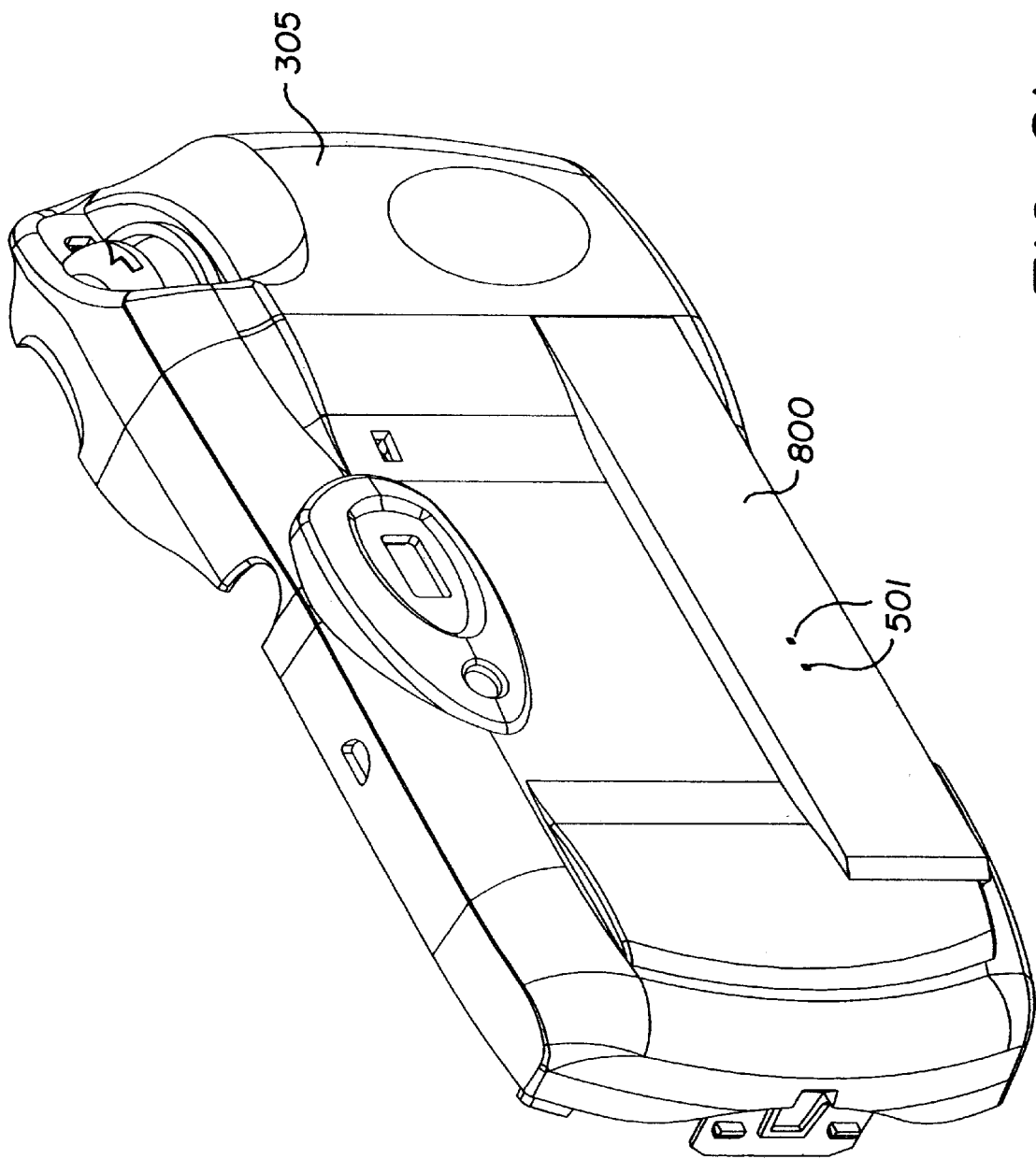
FIG. 21 shows a rear cover of an enabled camera having a recording device as shown in FIG. 19.

FIG. 21 illustrates the appearance of camera 305 having a recording device 60c as illustrated in FIGS. 19–20. The camera 305 would include a frame-like cover member 800 and conductive member 501 would be visible from outside the camera. FIGS. 22–23 illustrate the inside of the camera 305 having a recording device 60c positioned therein as described in FIGS. 19–20. As illustrated in FIG. 22, recording device 60c which would include pole pieces 500 as well as a support 507, can be fitted within an area 900 adapted to receive support member 507 with pole pieces 500 therein. When mounted onto area 900 as illustrated in FIG. 23, the recording device 60c would be securely held within camera 305.

In the embodiments described above in which the pole pieces are in constant contact with the film, there would be no need to force the recording device into contact with the film strip. All that would be needed is a basic force to ensure magnetic coupling.

The invention has been described in detail with particular reference to certain preferred embodiments thereof, but it will be understood that variations and modifications can be effected within the spirit and scope of the invention.

What is claimed is:

1. An interface control assembly for a one-time-use camera having a recording device, the interface control assembly comprising:

a controller adapted to receive and store photofinishing information;

a communication device adapted to transfer the information from the controller to the recording device of the camera to cause the information to be written on a filmstrip in the camera; and a motorized film advance drive for providing a constant angular velocity to a film advance mechanism of said camera, said film advance drive being operationally associated with said controller, wherein said film advance drive is adapted to advance the filmstrip as the information is being written on the filmstrip by the recording device based on the information supplied from said controller.

2. An interface control assembly according to claim 1, further comprising a user input section operationally associated with said controller for inputting user information to said controller.

3. An interface control assembly according to claim 1, wherein said communication device comprises a contact member for urging the recording device into contact with the filmstrip while the filmstrip is in the cameras.

4. An interface control assembly according to claim 1, wherein said recording device comprises an elastic member having magnetic pole pieces therein, said recording device being provided in a rear portion of said camera.

5. An interface control assembly according to claim 1, wherein said recording device comprises at least one magnetic pole piece provided in a rear cover of the camera, said at least one magnetic pole piece being positioned such that a first end of said at least one magnetic pole piece is in constant contact with film in said camera.

6. An interface control assembly according to claim 5, wherein a second end of the at least one magnetic pole piece end does not extend outside of the rear cover of the camera.

7. An interface control assembly according to claim 1, wherein said recording device comprises at least one magnetic pole piece, a conductive member and a coil wrapped around a portion of the at least one magnetic pole piece at the conductive member, said at least one magnetic pole piece, said conductive member and said coil being mounted in a support which is provided on a rear cover of the camera.

8. An interface control assembly according to claim 7, wherein said at least one magnetic pole piece is in constant contact with film in the camera.

9. An interface control assembly for a one-time-use camera having a recording device, the interface control assembly comprising:
   a controller adapted to receive and store photofinishing information; and
   a communication device adapted to transfer the information from the controller to the recording device of the camera to cause the information to be written on a filmstrip in the camera, wherein said communication device comprises a contact member for urging the recording device into contact with the filmstrip;
   said interface control assembly further comprising a receiving section having at least three end walls for receiving the camera therein, and a platform for holding the contact member in a non-recording position spaced from said recording device.

10. An interface control assembly according to claim 9, further comprising at least one first movement device for moving the platform to permit the contact member to be urged to a recording position against the recording device thereby forcing the recording device against the film.

11. An interface control assembly according to claim 10, further comprising a second movement device for moving the contact member from said recording position to said non-recording position.

12. An interface control assembly for a one-time-use camera having a recording device, the interface control assembly comprising:
   a controller adapted to receive and store photofinishing information; and
   a communication device adapted to transfer the information from the controller to the recording device of the camera to cause the information to be written on a filmstrip in the camera;
   wherein:
     said recording device comprises at least one magnetic pole piece provided in a rear cover of the camera, said at least one magnetic pole piece being positioned such that a first end of said at least one magnetic pole piece is in constant contact with film in said camera; and
     a second end of said at least one magnetic pole piece extends through the rear cover of the camera so as to be visible from outside the rear cover of the camera.

13. A photography arrangement comprising:
   a one-time-use camera having a recording device for recording on film in the camera, and a film advance mechanism for advancing the film; and
   an interface control arrangement adapted to supply photofinishing information to said recording device for writing on the film, said interface control arrangement being configured to receive said one-time-use camera in a recording position, said interface control arrangement comprising a controller for receiving and storing the photofinishing information, and a communication device for transferring the information from the controller to the recording device of the camera to cause the information to be written on the film when the one-time-use camera is in said recording position;
   wherein said interface control arrangement further comprises:
     a motorized film advance drive for providing a constant angular velocity to the film advance mechanism of said camera when said camera is in said recording position, said film advance drive being operationally associated with said controller, wherein said film advance drive is adapted to advance the filmstrip as the information is being written on the filmstrip by the recording device based on the information supplied from said controller.

14. A photography arrangement according to claim 13, wherein said communication device comprises a contact member adapted to urge the recording device into contact with the filmstrip.

15. A photography arrangement according to claim 13, wherein said recording device comprises an elastic member having magnetic pole pieces therein, said recording device being provided in a rear portion of said camera.

16. A photography arrangement according to claim 13, wherein said recording device comprises at least one magnetic pole piece provided in a rear cover of the camera, said at least one magnetic pole piece being positioned such that a first end of said at least one magnetic pole piece is in constant contact with film in said camera.

17. A photography arrangement according to claim 16, wherein a second end of the at least one magnetic pole piece end does not extend outside of the rear cover of the camera.

18. A photography arrangement according to claim 13, wherein said recording device comprises at least one magnetic pole piece, a conductive member and a coil wrapped around a portion of the at least one magnetic pole piece and the conductive member, said at least one magnetic pole piece, said conductive member and said coil being mounted in a support which is provided on a rear cover of the camera.

19. A photography arrangement according to claim 18, wherein said at least one magnetic pole piece is in constant contact with film in the camera.

20. A photography arrangement comprising:
   a one-time-use camera having a recording device for recording on film in the camera, and a film advance mechanism for advancing the film; and
   an interface control arrangement adapted to supply photofinishing information to said recording device for writing on the film, said interface control arrangement being configured to receive said one-time-use camera in a recording position, said interface control arrangement comprising a controller for receiving and storing the photofinishing information, and a communication device for transferring the information from the controller to the recording device of the camera to cause the information to be written on the film when the one-time-use camera is in said recording position;

wherein:

said recording device comprises at least one magnetic pole piece provided in a rear cover of the camera, said at least one magnetic pole piece being positioned such that a first end of said at least one magnetic pole piece is in constant contact with film in said camera; and a second end of said at least one magnetic pole piece extends through the rear cover of the camera so as to be visible from outside the rear cover of the camera.

21. A photography arrangement comprising:

a one-time-use camera having a recording device for recording on film in the camera, and a film advance mechanism for advancing the film; and an interface control arrangement adapted to supply photofinishing information to said recording device for writing on the film, said interface control arrangement being configured to receive said one-time-use camera in a recording position, said interface control arrangement comprising a controller for receiving and storing the photofinishing information, and a communication device for transferring the information from the controller to the recording device of the camera to cause the information to be written on the film when the one-time-use camera is in said recording position;

wherein:

said communication device comprises a contact member adapted to urge the recording device into contact with the filmstrip; and said interface control arrangement further comprises a receiving section having at least three end walls for receiving the camera therein.

22. A one-time-use camera comprising:

a recording device for writing information on film in the camera, said recording device comprising at least one magnetic pole piece which is adapted to be moved between a non-recording state in which the at least one magnetic pole piece is spaced from the film and a recording state in which the at least one magnetic pole piece is urged into contact with the film and an electrical current is applied to the at least one magnetic pole piece;

wherein said at least one magnetic pole piece is located in an elastic member which is attached to a cover of said camera, such that in the non-recording state the elastic member is in a relaxed state to maintain the at least one magnetic pole piece in a position spaced from the film, and in the recording state a portion of the elastic member is bent to force the elastic member toward the film and cause the at least one magnetic pole piece to contact the film.

23. A one-time-use camera comprising:

a recording device for writing information on film in the camera, said recording device comprising at least one magnetic pole piece which is provided in a cover of said camera, said at least one magnetic pole piece having a first end which is in constant contact with film in the camera for recording on the film when a current is applied to the at least one magnetic pole piece;

wherein said at least one magnetic pole piece comprises a second end which extends through a rear end of the cover so as to be visible from outside the cover.

24. A one-time-use camera according to claim 23, wherein said at least one magnetic pole piece comprises a second end which does not extend beyond a rear end of the cover.

25. A one-time-use camera according to claim 23, wherein said recording device further comprises a conductive member and a coil wrapped around a portion of the at least one magnetic pole piece and the conductive member, said conductive member extending through a rear end of the cover of the camera.

26. A one-time-use camera according to claim 25, wherein said at least one magnetic pole piece, said conductive member and said coil are mounted on a support which is provided on the cover of the camera.

27. A method of recording information on film of a one-time-use camera, the method comprising:

loading the camera having at least one magnetic pole piece therein onto a receiving section of an interface control assembly having a contact member;

supplying an electrical current to the at least one magnetic pole piece; and urging the contact member toward the one-time-use camera to force the at least one magnetic pole piece into contact with the film in the camera.

28. A method according to claim 27, further comprising: winding the film in the camera as the at least one magnetic pole piece having the electrical current supplied thereto is in contact with the film.

29. A method of recording information on film of a one-time-use camera, the method comprising:

loading the camera having at least one magnetic pole piece therein on an interface control assembly, said at least one magnetic pole piece having a first end which is in contact with film in the camera and a second end which extends through a rear cover of the camera; and recording on the film of the one-time-use camera by supplying an electrical current to the at least one magnetic pole piece.

* * * * *